US008526350B2

(12) United States Patent
Xue et al.

(10) Patent No.: US 8,526,350 B2
(45) Date of Patent: Sep. 3, 2013

(54) SYSTEMS AND METHODS FOR CARRYING BROADCAST SERVICES OVER A MOBILE BROADCAST NETWORK

(75) Inventors: Qi Xue, San Diego, CA (US); An Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 807 days.

(21) Appl. No.: 12/470,384

(22) Filed: May 21, 2009

(65) Prior Publication Data

US 2009/0291631 A1 Nov. 26, 2009

Related U.S. Application Data

(60) Provisional application No. 61/055,953, filed on May 23, 2008.

(51) Int. Cl.
H04H 20/71 (2008.01)

(52) U.S. Cl.
USPC .......................................................... 370/312

(58) Field of Classification Search
None
See application file for complete search history.

(56) References Cited

U.S. PATENT DOCUMENTS

| | | | |
|---|---|---|---|
| 7,917,644 B2 * | 3/2011 | Vedantham et al. | 709/231 |
| 8,005,990 B2 * | 8/2011 | Khalil et al. | 709/247 |
| 2003/0134651 A1 | 7/2003 | Hsu | |
| 2007/0050820 A1 * | 3/2007 | Saarikivi et al. | 725/62 |
| 2007/0116051 A1 * | 5/2007 | Chen | 370/469 |
| 2007/0127476 A1 | 6/2007 | Seppala | |
| 2007/0207727 A1 | 9/2007 | Song et al. | |
| 2008/0168178 A1 * | 7/2008 | Bouazizi | 709/231 |
| 2008/0189540 A1 * | 8/2008 | Jansky | 713/2 |
| 2009/0034556 A1 * | 2/2009 | Song et al. | 370/471 |
| 2009/0077591 A1 * | 3/2009 | Jeon et al. | 725/50 |
| 2009/0080573 A1 * | 3/2009 | Song et al. | 375/321 |
| 2009/0222585 A1 * | 9/2009 | Khalil et al. | 709/246 |
| 2010/0080163 A1 * | 4/2010 | Krishnamoorthi et al. | 370/312 |

FOREIGN PATENT DOCUMENTS

| | | |
|---|---|---|
| EP | 1816766 | 8/2007 |
| KR | 20070079328 A | 8/2007 |

OTHER PUBLICATIONS

"Digital Video Broadcasting (DVB); IP Datacast over DVB-H: Electronic Service Guide (ESG) European Broadcasting Union Union Europeenne de Radio-Television; ETSI TS 102 471"; ETSI Standards, Lis, Sophia Antipolis, Cedex, France, Apr. 1, 2006; XP014033898 the whole document.
Murali R Chari et al: "FLO Physical Layer: An Overview" IEEE Transactions on Broadcasting, IEEE Service Center, Piscataway, NJ, US, vol. 53, No. 1, Mar. 1, 2007, pp. 145-160, XP011172013, ISSN: 0018-9316 the whole document.

(Continued)

*Primary Examiner* — Otis L Thompson, Jr.
(74) *Attorney, Agent, or Firm* — The Marbury Law Group, PLLC

(57) ABSTRACT

A method for carrying different types of broadcast services over a first mobile broadcast network that carries a first type of service content may include adapting a second type of service content, different from the first type of service content, for transport over the first mobile broadcast network, adapting service bootstrapping information, and mapping service layer addresses to data flow addresses of the first mobile broadcast network. On the receiver side, a broadcast flow address for service bootstrapping information may be discovered, the service bootstrapping information acquired from the discovered broadcast flow address, service layer addresses may be obtained from the bootstrapping information, and service components of the second type of service content acquired from the broadcast network.

68 Claims, 27 Drawing Sheets

(56) References Cited

OTHER PUBLICATIONS

Qualcomm Incorporated: "Technology Comparison: Mediaflow (TM) and DVB-H"[Online] 2007, XP002543672 Retrieved from the internet: URL:http://www.eetasia.com/ARTICLES/2007AUG/PDF/EEOL_2007AUG31_DSP_NETD_AN.pdf?SOURCES=DOWNLOAD> [retrieved on Aug. 31, 2009] the whole document.

Qualcomm Incorporated: "FLO Technology Overview: Revolutionizing Multimedia" [Online] 2009, XP002543671 Retrieved from the internet:URL:http://www.mediaflo.com/news/pdf/tech_overview.pdf> [retrieved on Aug. 31, 2009] the whole document.

International Search Report, PCT/US2009/044984, International Searching Authority, European Patent Office, Sep. 14, 2009.

Written Opinion, PCT/US2009/044984, International Searching Authority, European Patent Office, Sep. 14, 2009.

* cited by examiner

SYSTEMS AND METHODS FOR CARRYING BROADCAST SERVICES OVER A MOBILE BROADCAST NETWORK

RELATED APPLICATIONS

The present application claims the benefit of priority to U.S. Provisional Patent Application No. 61/055,953 filed May 23, 2008 entitled "Systems And Methods Of Carrying Broadcast Services Over A Forward Link Only Network," the entire contents of which are hereby incorporated by reference.

BACKGROUND

A mobile broadcast system may be divided into two layers: the service layer and the broadcast distribution layer. The broadcast distribution layer in a mobile broadcast system may provide transport services for the broadcasting data flow to multiple receiving devices simultaneously. The data transport function of the broadcast distribution layer is provided by a physical broadcast distribution network including broadcast transmitters and receiving devices. Exemplary broadcast distribution networks include the MEDIAFLO ("FLO") network and the digital video broadcasting-handheld ("DVB-H") network. A broadcast distribution layer exists on the broadcast side within the server that sends the broadcast program to the transmitters, performing the formatting, encoding and related processing to generate data packets for transmission over the air. A broadcast distribution layer also exists on the receiver side within mobile devices performing packet reception, error detection/correction, routing and related processes of receiving transmitted data packets and providing them to the service layer.

In a typical hardware-software architecture, the service layer sits on top of the broadcast distribution layer and provides service functions that enable the broadcast services over the broadcast distribution network. A service layer exists on both the broadcast and receiver sides. Primary functions of the service layer on the broadcast side are: service content encoding; service content delivery from an Internet protocol ("IP") layer (or equivalent layer, or higher layer); service discovery and notification; sending the service guide and electronic service guide ("ESG"); and service and content protection. Similarly, on the receiver side the service layer provides: service content decoding; delivery of IP data to the IP layer (or equivalent or higher layer); service discovery and notification; processing of the service guide and ESG; and service and content verification. Exemplary mobile broadcast services include the digital video broadcasting-Internet protocol data casting ("DVB-IPDC") service, the open mobile alliance mobile broadcast services enabler suite ("OMA BCAST") service, and the MediaFLO service.

In overview, the distribution layer includes the processing associated with sending and receiving the bits and bytes transmitted over the air while the service layer includes the processing associated with defining how the bits and bytes are delivered through the network, interpreted, used and presented to the user by the receiver device.

SUMMARY

An adaptation layer is disclosed on the broadcast and receiver sides of a mobile broadcast network to enable a mobile broadcast network configured to carry a first type of service to carry a second type of media service. The adaptation layer provides commonality between the distribution layer of the mobile broadcast network transmissions and the respective service layers associated with the first and second types of service layers. So configured, a broadcast network can carry content configured for a different type of broadcast network and the content can be received by receiver devices without modifying the broadcast transmission protocol or equipment or requiring receivers to include a second receiver circuitry. The adaptation layer may enable the receiver device to obtain all of the service layer information associated with the second type of service from the transmissions received via the mobile broadcast network of the first type. Such services may include receiving and using the service guide or electronic service guide and bootstrapping the broadcast reception service.

BRIEF DESCRIPTION OF THE DRAWINGS

The accompanying drawings, which are incorporated herein and constitute part of this specification, are illustrative of aspects of the invention, and together with the general description given above and the detailed description given below, serve to explain the features of the invention.

DETAILED DESCRIPTION

Figure 1:
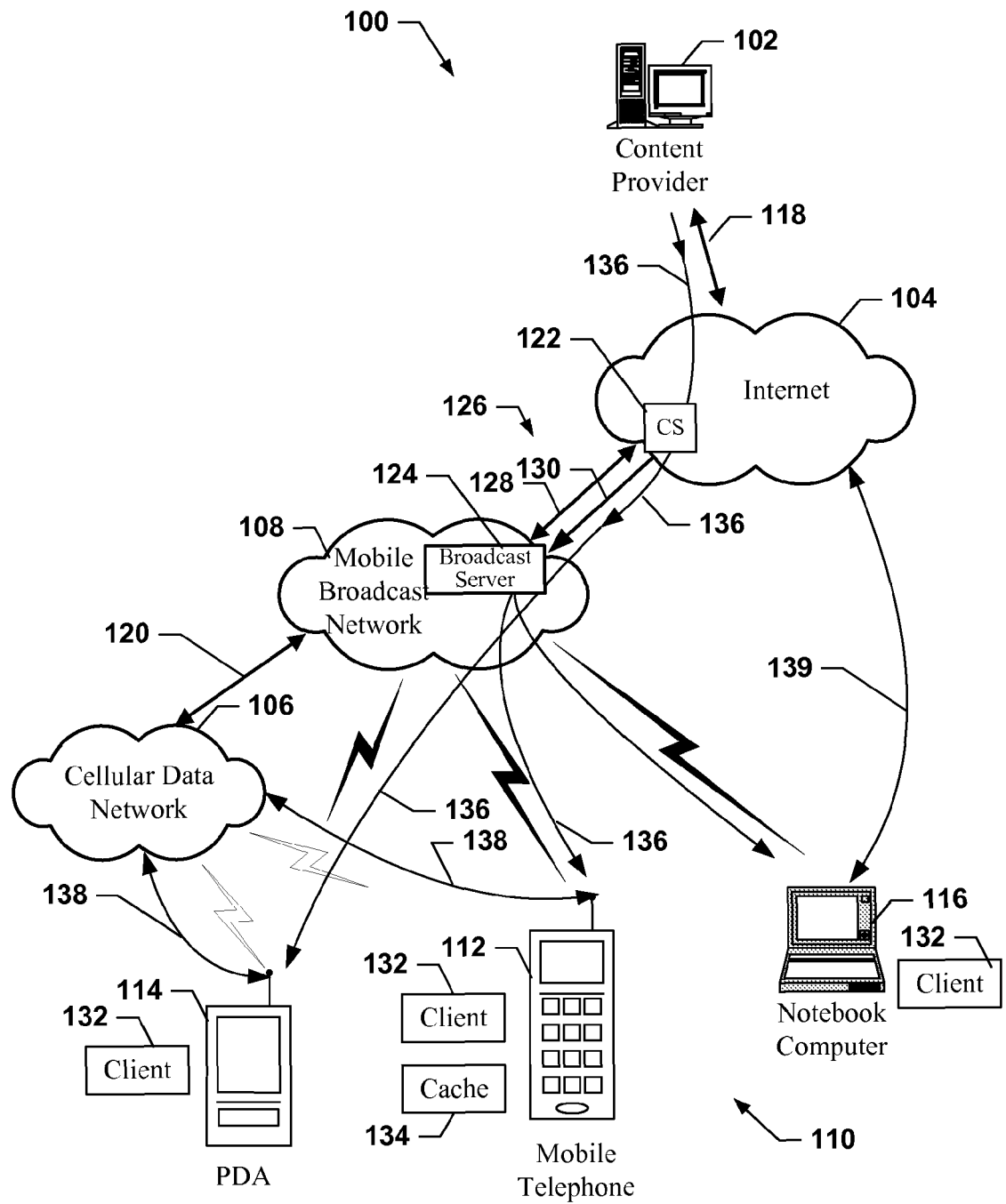
FIG. 1 is a system component diagram illustrating an aspect of a content delivery system.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the terms "receiver device," "mobile device" and "handheld device" refer to any one or all of mobile TV receivers, cellular telephones, personal data assistants (PDA's), palm-top computers, wireless electronic mail receivers (e.g., the Blackberry® and Treo® devices), multimedia cellular telephones (e.g., the Blackberry Storm®), laptop computers, and similar personal electronic devices which are configured to receive communications from a mobile broadcast network.

As used herein, the term "server" refers to any of a variety of network servers including those commercially available and that may come available in the future. Typically, a server includes the components described herein with reference to FIG. 27 and may be configured with server processor executable instructions to perform the methods described herein.

A number of different mobile broadcast television services and broadcast standards are available or contemplated in the future, all of which may implement and benefit from the various aspects described herein. Such services and standards include Open Mobile Alliance Mobile Broadcast Services Enabler Suite (OMA BCAST), MediaFLO services, Digital Video Broadcast IP Datacasting (DVB-IPDC), and China Multimedia Mobile Broadcasting (CMMB). Typically, mobile broadcast program transmission are encrypted so that the access to programming can be sold on a subscription or pay-per-view basis, while a service guide is broadcast unencrypted to enable receiver devices to present users with a listing of available programs. Information that enables a receiver device to discover the programs that are available and prepare to receive and display selected broadcast programs is referred to as service "bootstrap" information. Service bootstrap information is typically carried on a particular well known service layer address, although the address carrying such information may vary among the different types of mobile broadcast services and among different mobile broadcast service providers.

An adaptation layer on the broadcast and receiver sides of a mobile broadcast network enables a mobile broadcast network configured to carry a first type of service to carry a second type of media service. The adaptation layer provides commonality between the distribution layer of the mobile broadcast network transmissions and the respective service layers associated with the first and second types of service layers. So configured, a broadcast network can carry content configured for a different type of broadcast network and the content can be received by receiver devices without modifying the broadcast transmission protocol or equipment or requiring receivers to include a second receiver circuitry. The adaptation layer may enable the receiver device to obtain all of the service layer information associated with the second type of service from the transmissions received via the mobile broadcast network of the first type. Such services may include receiving and using the service guide or electronic service guide and bootstrapping the broadcast reception service.

The description herein below utilizes Media FLO standard terminology and message addressing as an illustrative example. The other mobile broadcast standards use similar architectures differing in terminology and details that are not critical. Thus, while the descriptions refer to a FLO mobile broadcast network (or a FLO network) including a MediaFLO first service layer in which the adaptation layer enables transport of OMA BCAST and DVB-IPDC services, the claims apply equally well to an OMA BCAST mobile broadcast network in which the adaptation layer enables transport of MediaFLO and DVB-IPDC services. To reflect this applicability to all forms of mobile broadcast networks and services, references will frequently be made to first and second types of services carried on a mobile broadcast network of a first type. Such references are not intended to limit the number of service types which may be transported over a mobile broadcast network configured with an adaptation layer to only two types as any number of different types of service may be carried. Further, such references are not intended to limit the second type of services to mobile broadcast services, because other types of communication protocols may also be transported including, for example, Internet protocol (IP) services.

FIG. 1 shows an exemplary communication network 100 that includes a mobile broadcast network transport system which operates to create and transport multimedia content flows that are broadcast to a plurality of mobile broadcast receiver devices. For example, the mobile broadcast network can receive content clips from a content provider network and broadcast them to mobile broadcast receivers. The communication network 100 may include a content provider (CP) 102, a data network such as the Internet 104, and a mobile broadcast network 108. The communication network 100 also includes mobile broadcast receiver devices 110 such as a mobile telephone 112, a personal digital assistance (PDA) 114, and a notebook computer 116. The mobile devices 110 illustrate just some of the devices that may receive broadcast transmissions 136 from the broadcast communication network 108. It should be noted that although three types of mobile devices are shown in FIG. 1, virtually any number of devices, or types of devices, are suitable for use in the broadcast communication network 108.

The broadcast communication network 108 may communicate (via network connection 120) with a cellular data network 106 to communicate directly with mobile devices 110 (via cellular data links 138), such as to provide provisioning information and decryption keys to enable mobile devices 110 to receive encrypted content. Further, mobile devices 110 may communicate with the mobile broadcast network 108 via cellular data links 138 and the cellular data network 106, such as to request broadcast services, purchase program subscriptions, etc. In some implementations, addressed communications between the broadcast communication network 100 and some receiver devices, such as a laptop computer 116, may be accomplished via the Internet 104, such as via a WiFi or other Internet connection 139.

The content provider 102 may be any of a variety of sources of audio, video and image content for distribution to receiver devices 110 via the broadcast communication network 108. The content may include any one or more of video, audio, multimedia content, clips, real-time and non real-time content, scripts, programs, data, or any other type of suitable content. In a typical implementation the content provider 102 provides the content to the broadcast communication network 108 for broadcast. For example, the content provider 102 may send content to a content server 122 via the Internet 104 via an Internet connection 118, which may include any suitable type of wired and/or wireless communication link.

Content from the content provider 102 may be stored in a content server 122 which can be accessed by a broadcast server 124 within the mobile broadcast network 108 via a transport interface 126. When accessed by the broadcast server 124, content may stream from the content server 122 via the transport interface 126 in the format in which the content was generated by the content provider 102. The content provider 102 may be another type of mobile broadcast network or generate content in a service format different from that of the mobile broadcast network 108.

The content server 122 and the broadcast server 124 may communicate using one or more aspects of a transport interface 126 that allows the content server 122 to deliver content in the form of content flows. The broadcast server 124 may be configured to accept the content flows and transform them into a format suitable for broadcast via the mobile broadcast network 108 to the mobile devices 110. The transport interface 126 may include a control interface 128 and a bearer channel 130. The control interface 128 operates to allow the broadcast server 124 to select, add, change, cancel, or otherwise modify content flows that are supplied by the content server 122 to the broadcast server 124 where the content flows are formatted for broadcast via the mobile broadcast network 108 transmitters. The bearer channel 130 operates to transport the content flows from the content provider network 104 to the broadcast server 124.

The broadcast server 124 may use the transport interface 126 to schedule a content flow from the content server for broadcast over the mobile broadcast network 108. For example, the content flow may include a non real-time content clip that was provided by the content provider 102. As the broadcast server 124 receives the content clip, it formats the data into the proper format for broadcast over the mobile broadcast network 108 for reception by one or more of the mobile devices 110. Any of the mobile devices 110 may be authorized to receive the content clip and cache it within memory for viewing by the device user.

For example the mobile device 110 may be configured in executable software instructions with a client program 132 that operates to process received broadcast signals provide users with a service guide that displays a listing of content that is scheduled for broadcast over the wireless access network 108. The mobile device user may use the service guide to select for reception any particular broadcast content which may then be rendered in real-time or stored in a cache 134 for later viewing. For example, if a content clip is scheduled for broadcast during the evening hours, a user may configure their mobile device 112 to receive the broadcast and store the content clip in the cache 134 so that the user can view the clip the next day.

Mobile broadcast networks 108 typically broadcast a program guide or service guide, which is a listing of available and scheduled broadcast content that the receiver devices 110 can receive and use to render a program guide display for use by users in selecting a particular program to view. The program guide or service guide also may include information that the receiver devices need to enable them to receive requested programs. Broadcast information regarding a network's broadcast content (i.e., what will be broadcast when on what addresses) is referred to in various types of mobile broadcast network systems as a program guide, service guide (SG), or electronic service guide (ESG). For ease of reference, such broadcast information regarding broadcast content will be referred to herein as "service guide" information. The service guide may be assembled in a server such as the content server 122 or broadcast server 124 based upon program content scheduled for broadcast. The content server 122 or the broadcast server 124 may update service guide information with updates broadcasted on a periodic basis.

Figure 2:
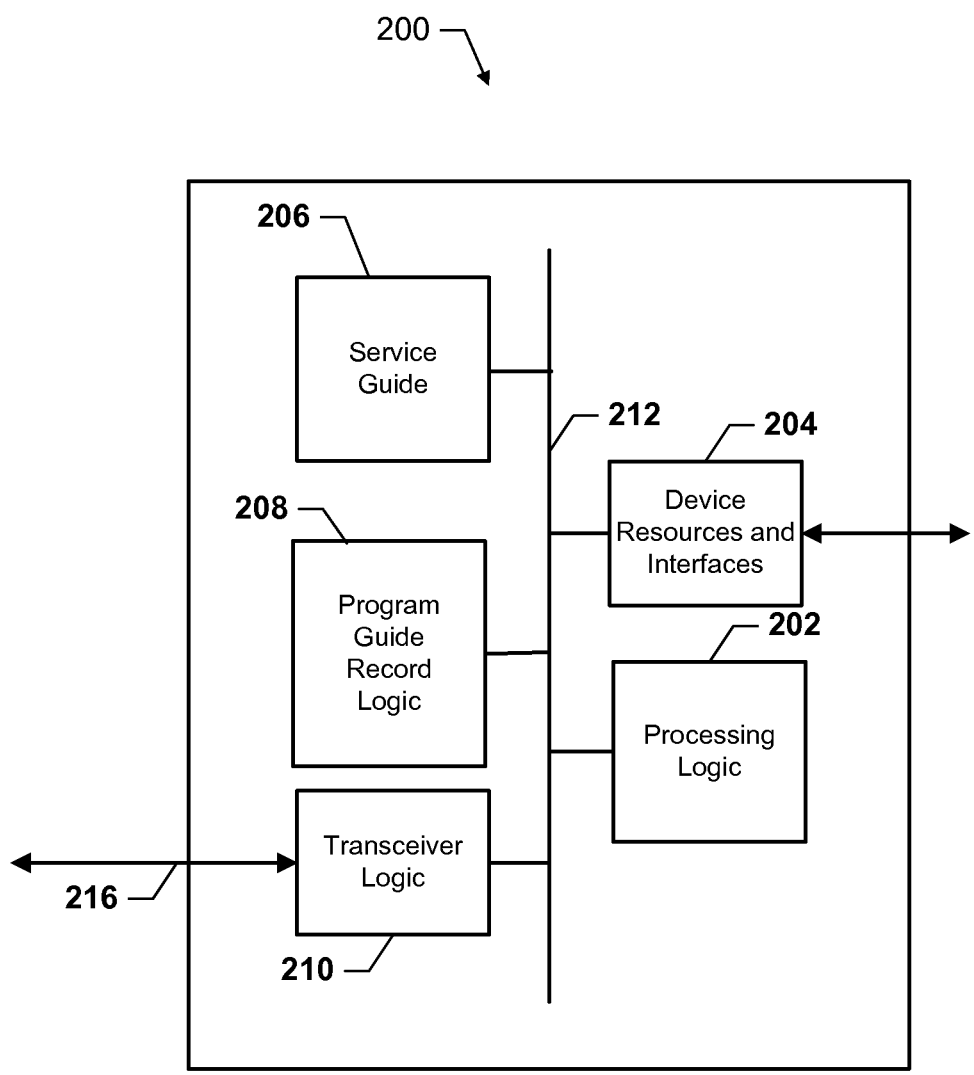
FIG. 2 is a block diagram illustrating elements of a content provider for a content delivery system.

FIG. 2 illustrates functional elements of an exemplary server 200 suitable for use as the content server 122 or broadcast server 124 in FIG. 1. For example, the server 200 may include processing logic 202, device resources and interfaces 204, and transceiver logic 210, all coupled to an internal data bus 212. The server 200 may also include service guide storage 206 and a service guide record or state logic 208, which are also coupled to the data bus 212. Each of the processing logic elements may be implemented in software processes executing on a server processor, which is described in more detail below with reference to FIG. 27, within one or more separate processors, or within dedicated logic circuits. For example, the processing logic 202 may include a CPU, processor, gate array, hardware logic, memory elements, virtual machine, software, and/or any combination of hardware and software. Thus, the processing logic 202 can include logic circuits to execute machine-readable instructions and to control one or more other functional elements of the server 200 via the internal data bus 212.

The device resources and interfaces 204 may include hardware and/or software that enable the server 200 to communicate with internal and external systems. For example, the internal systems may include mass storage systems, memory, a display driver, modems, and other internal device resources. The external systems may include user interface devices, printers, disk drives, or other local devices or systems.

The transceiver logic 210 may include hardware logic, software logic, or a combination thereof, that operates to enable the server 200 to transmit and receive data and/or other information with remote devices or systems using a communication channel 216 via a network. For example, in one aspect, the communication channel 216 includes any suitable type of communication link to allow the server 200 to communicate with a data network, such as the Internet 104, a control interface 128, or a bearer channel 130 as illustrated in FIG. 1.

The service guide storage 206 includes information stored in memory in any suitable format which describes content and/or services that are available for mobile devices 110 to receive. For example, the service guide storage 206 may be provided in a local memory of the server 200 or in a database server coupled to the server 200, and may include information such as content or service identifiers, scheduling information, pricing, and/or any other types of relevant information related to scheduled program content. The service guide 206 may include one or more identifiable sections that are updated by the processing logic 202 as changes are made to the available content or services.

The service guide record or state logic 208 may include hardware, software, or a combination thereof that operates to generate the service guide information that is broadcasted to receiver devices 110. For example, when the processing logic 202 updates the service guide 206, such as in response to receiving notification of changes from the content provider 102, the service guide record or state logic 208 may generate an update to all or sections of the service guide that is broadcasted to receiver devices 110. In some implementations, the service guide record or state logic 208 may also serve to coordinate the content flows delivered to the broadcast server 124, such as by communicating with the content server 122, consistent with the service guide information so that content is processed for broadcast at the appropriate time.

Figure 3:
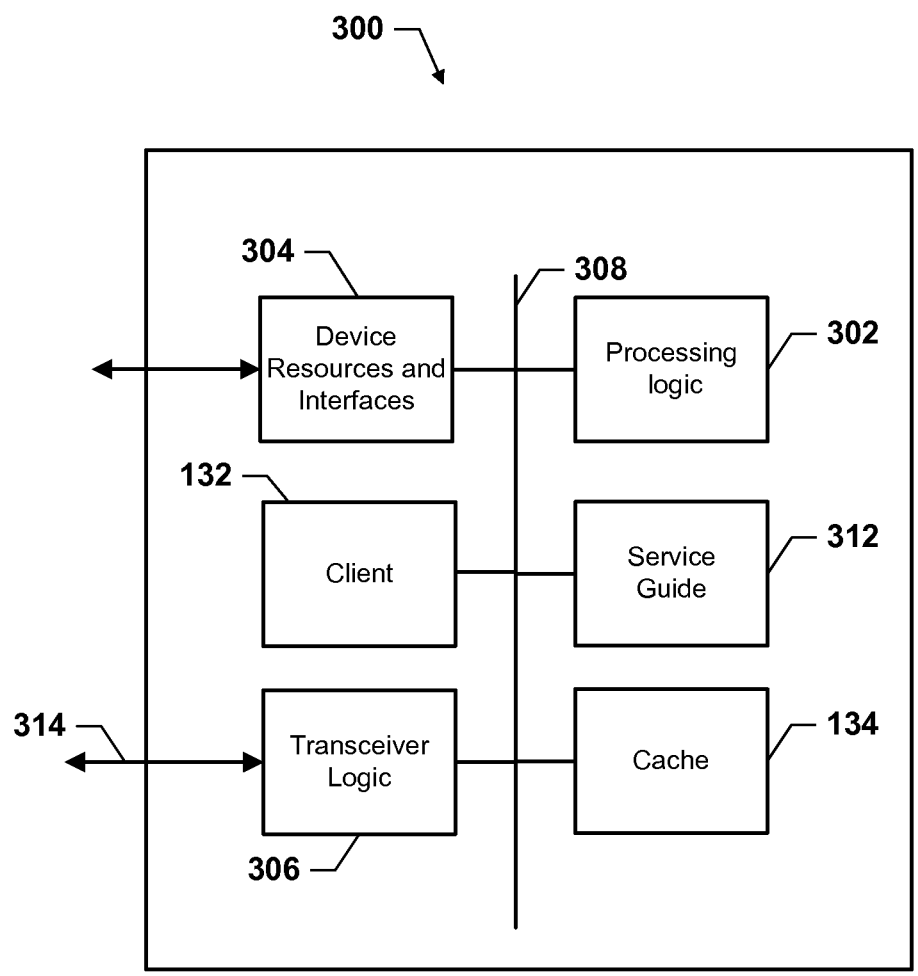
FIG. 3 is a block diagram illustrating elements of a content provider for a content delivery system.
Figure 26:
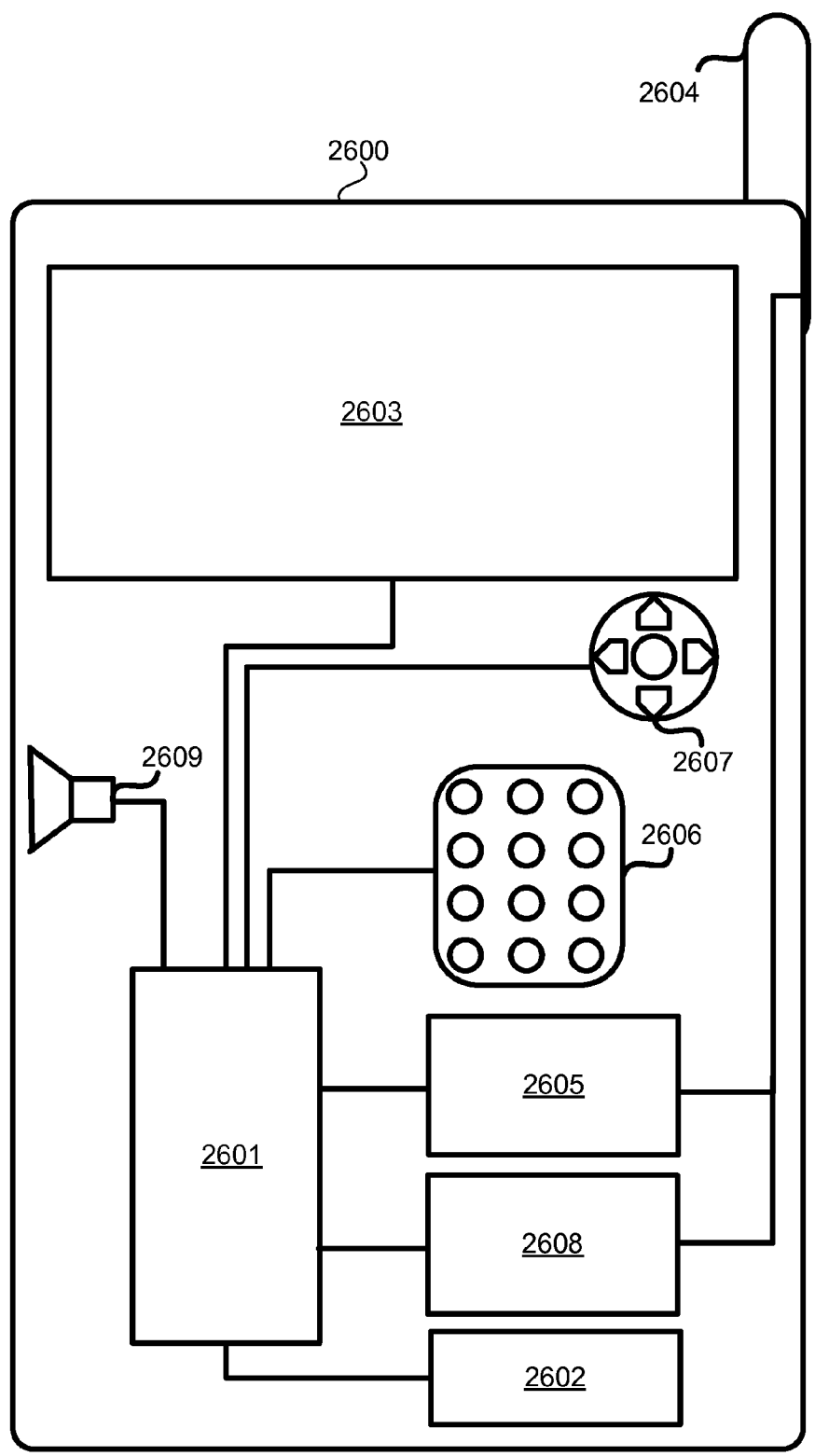
FIG. 26 is a component block diagram of a mobile device.

FIG. 3 illustrates logical components of a receiver device 300 suitable for use as the receiver devices 110 shown in FIG. 1. The receiver device 300 may include processing logic 302, device resources and interfaces 304, and transceiver logic 306, all coupled to a data bus 308. The receiver device 300 may also include a client process 132 and a service guide memory 312, which are also coupled to the data bus 308. Further, as mentioned above with reference to FIG. 1, the receiver device 300 may include cache 134, such as internal memory, suitable for storing downloaded program content for later presentation. The service guide memory 312 and cache 134 may be included within the same memory unit, which may be solid state memory (such as FLASH memory), hard disc memory, or a combination of the two. In one or more aspects, the processing logic 302 may include a CPU, processor, gate array, hardware logic, memory elements, virtual machine, software, and/or any combination of hardware and software. Thus, the processing logic 302 can include logic configured to execute machine-readable instructions to control one or more other functional elements of the receiver device 300 via the internal data bus 308. Further description of structures and circuits that may be included within receiver devices 300 is provided below with reference to FIG. 26.

The device resources and interfaces 304 may include hardware and/or software that allow the receiver device 300 to communicate with internal and external systems. For example, internal systems may include mass storage systems, memory, a display or display driver, integrated keypads, speakers, modems, or other internal device resources. The external systems may include user interface devices and attached devices, such as printers, disk drives, external speakers, external displays, or other local devices or systems.

The transceiver logic 306 includes hardware and/or software that operate to allow the receiver device 300 to transmit and receive data and/or other information with external devices or systems through a communication channel 314. For example, in mobile devices the communication channel 314 may include a broadcast receiver configured to receive signals from a mobile broadcast network 108, and a cellular data network transceiver configured to communicate with a wireless communication link 138, such as with a cellular data network 106.

During operation, the receiving device 300 may be activated so that it can receive available content or services broadcasted by the mobile broadcast network 108. For example, the receiving device 300 may begin the activation process by monitoring broadcast signals 136 and receiving and storing service guide records in a service guide memory 312. As described above, the service guide 312 contains information that identifies content or services available for the receiver device 300 to receive from the mobile broadcast network 108. The client 132 may operate to interpret the service guide records and render information in the service guide on the mobile device 300 using the device resources and interfaces 304. For example, the client 132 may render information in the service guide logic 312 on a display screen that is part of the receiver device 300. The client 132 may also receive user inputs through the device resources and interfaces so that a device user may select content or services for reception.

The receiver device 300 may receive notification messages through the transceiver logic 306. For example, guide notification messages may be broadcast or unicast to the receiver device 300 and received by the transceiver logic 306. The service guide notification messages identify updates to the service guide records which may be received and stored in the service guide memory 312. The client 132 may process the service guide notification messages to determine whether the local copy stored in the service guide memory 312 needs to be updated. For example, the notification messages may include a section identifier, start time, end time, and version number. The receiver device 300 may compare the information in received service guide notification messages to information stored in the service guide memory 312. If the receiver device 300 determines from the service guide notification messages that one or more sections of the local copy of the service guide needs to be updated, the receiver device 300 may operate to receive the updated sections of the service guide.

Figure 4A:
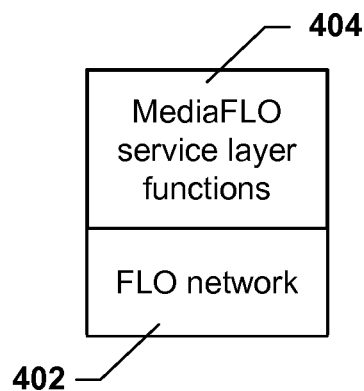
FIGS. 4A and 4B are a protocol stack diagrams.

A typical mobile broadcast system includes a protocol stack which enables treating transport functions separately from the broadcast and transmission functions. For example, as illustrated in FIG. 4A, processors on the broadcast and receiver side may both implement a distribution layer 402 which performs functions related to data transport provided by the physical broadcast distribution network which includes the broadcast transmitters and receivers within receiving devices 110. Thus, the transport layer 402 includes all of the processes related to transmitting data in broadcast transmitters and receiving the broadcasted data in receiving device receivers.

On top of the broadcast transport layer may be a service layer 404 which enables the broadcast or reception of content via the distribution layer 402. Typical functions performed by the service layer on the broadcast side include service content encoding, service content delivery from higher layers such as an IP layer, transmission of service guide and ESG information, and service and content protection. On the receiver side, the service layer may perform service content decoding, service discovery and notification, reception of the service guide and ESG information, and functionality associated with protecting services and content.

The example illustrated in FIG. 4A is a protocol stack for a FLO network. As the figure illustrates, in a typical mobile broadcast network implementation, the service layer 404 is of the same kind as the distribution layer 402. Thus, data received by the FLO network distribution layer of 402 is provided directly to the MediaFLO service layer 404 on the receiver side, and directly from the MediaFLO service layer 404 to the FLO network distribution layer 402 on the broadcast side. A conventional FLO mobile broadcast network broadcasts MediaFLO content. Some broadcast distribution networks may provide a generic data transport function to one or more service layers above the distribution layer. For example, a DVB-H network can support both the DVB-IPDC service layer and the OMA BCAST service layer. However, a DVB-H network cannot support a MediaFLO service layer. Thus, a conventional mobile broadcast network may be limited to broadcasting the same type of content.

This limitation on the mobile broadcast networks may limit the content available for broadcast by particular mobile broadcast network service providers. For example, a mobile broadcast network service provider operating a conventional FLO network can only broadcast content formatted for processing by the MediaFLO service layer 404. Thus, content formatted for other types of mobile broadcast networks may be unavailable to that particular service provider. This limitation may also restrict the audience for mobile broadcast transmissions to only those receiver devices 110 configured to receive the type of mobile broadcast provided by the service provider.

An adaptation layer within the protocol stack implemented on the broadcast and receiver sides of a mobile broadcast network provides adaptation functions that enable the mobile broadcast network to provide a generic broadcast data transport for other types of service layers.

Figure 4B:
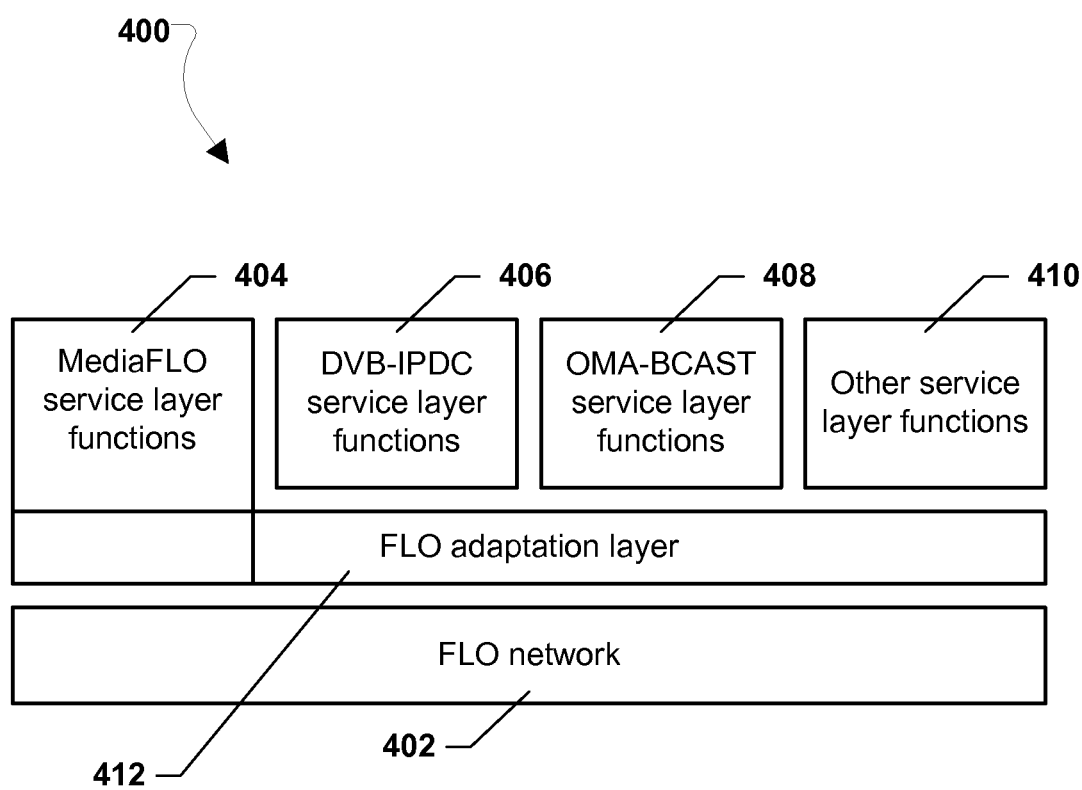

FIG. 4B illustrates a protocol stack, generally designated 400, that may be implemented on the broadcast and receiver sides of a mobile broadcast network system. In the example illustrated in FIG. 4B, the mobile broadcast network is a FLO network, thus the protocol stack includes a FLO network distribution layer 402 and a MediaFLO service layer 404. Additionally, an adaptation layer 412 is provided above the FLO network distribution layer 402 to enable passing data flows to a DVB-IPDC service layer 406, an OMA-BCAST service layer 408, and/or another type of service layer 410. Each of the service layers 404, 406, 408, 410 may provide one or more service layer functions well-known to their corresponding type of mobile broadcast network. The FLO adaptation layer 412 may be configured or otherwise made operable to execute the various processes described herein in order to allow non-MediaFLO service layers, e.g., the DVB-IPDC service layer 406, the OMA-BCAST service layer 408, and the other service layer 410 to operate on the FLO network, thus allowing a FLO network to carry content from non-FLO broadcast distribution networks.

An adaptation layer 412 shown in FIG. 4B may differ depending upon whether the implementing processor is on the broadcast or receiver sides of the mobile broadcast communications link. For example, on the broadcast side, such as within the broadcast server 124, the functions performed by the adaptation layer 412 may include encapsulating a different type of service content within a compatible protocol package, such as an IP protocol packet, so that the information can be transported over the broadcast transport layer 402. Other functions performed by the adaptation layer on the broadcast side are described more fully below. In contrast, on the receiver side, the adaptation layer may include obtaining service content from the transport protocol packages, such as IP protocol packets, and providing the service content to the corresponding service layer, 406-410.

Figure 5:
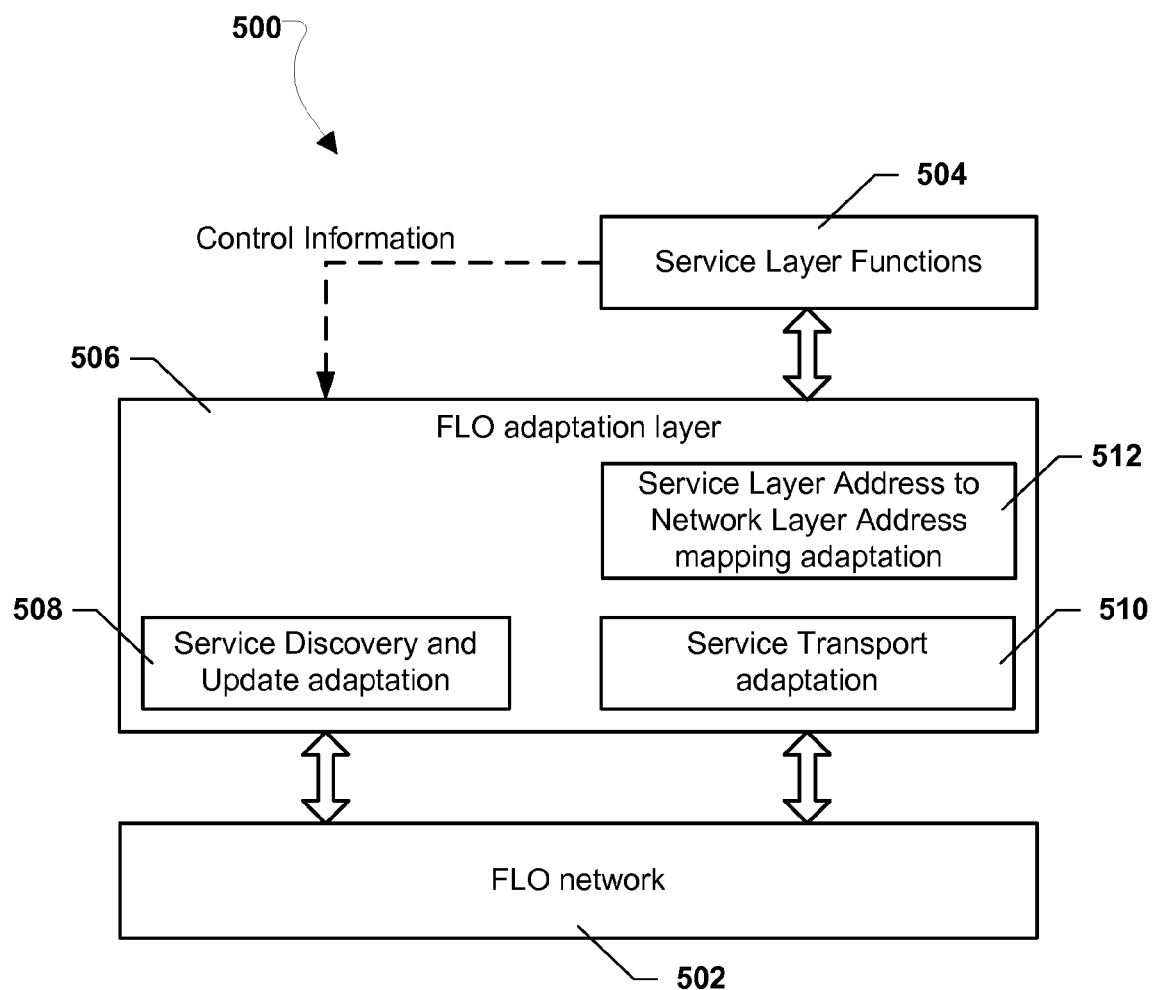
FIG. 5 is a protocol stack diagram.

Since mobile broadcast networks carry both service content and service guide information sufficient to enable receiver devices to discover the available content, the adaptation layer must address both types of information carried by the mobile broadcast network transport layer. FIG. 5 shows more details related to a portion 500 of the protocol stack illustrated in FIG. 4B. The protocol stack portion 500 illustrated in FIG. 5 includes a FLO network distribution layer 502 and a service layer 504, between which is provisioned a FLO adaptation layer 506. The FLO adaptation layer 506 may include a service discovery and update adaptation module 508, a service transport adaptation module 510, and a service layer address to network layer address mapping adaptation 512. The service transport adaptation module 510 may perform the adaptation functions to enable transport of service layer data flows over the FLO network 502. Thus, on the broadcast side the service transport adaptation model 510 performs adaptations, such as encapsulation within compatible transport protocol packets, while on the receiver side the transport adaptation module 510 reverses the process so that the service content can be provided in a usable format to the corresponding service layer 504. The service discovery and update adaptation module 508 is operable to enable the network transport layer 502 to carry the service guide and other information needed for receiver devices to bootstrap reception. Thus, on the broadcast side, the service discovery and update adaptation module 508 may adapt the service guide and service bootstrapping information or transmission via the network distribution layer 502, while on the receiver side, the service discovery and update adaptation module 508 reverses the process so that the service guide and other bootstrapping information can be discovered by the corresponding service layer 504. The adaptations performed by the service discovery and update adaptation module 508 allow a receiving device to discover the other type of services (i.e., the adapted services) available from the mobile broadcast network. The service discovery and update adaptation module 508 may also adjust the address or network address (e.g., a flow ID) associated with the service guide and bootstrapping information flows in a service layer address to network layer address mapping adaptation 512 so that the corresponding service layer 504 can access the information.

In order to enable the service layer 504 to function in its ordinary manner, such as to perform the functions associated with the corresponding type of mobile broadcast service, the service layer 504 may provide control information to the FLO adaptation layer 506. For example, in order to access a particular broadcast program, the service layer 504 may indicate to the adaptation layer 506 the particular network address (e.g., a flow ID) to be accessed from the network distribution layer 502. The flow adaptation layer 506 may then use that network address (e.g., a flow ID) to access a particular content flow which is then adapted by the service transport adaptation module 510 in order to put it into a format compatible with the service layer functions 504.

Figure 6:
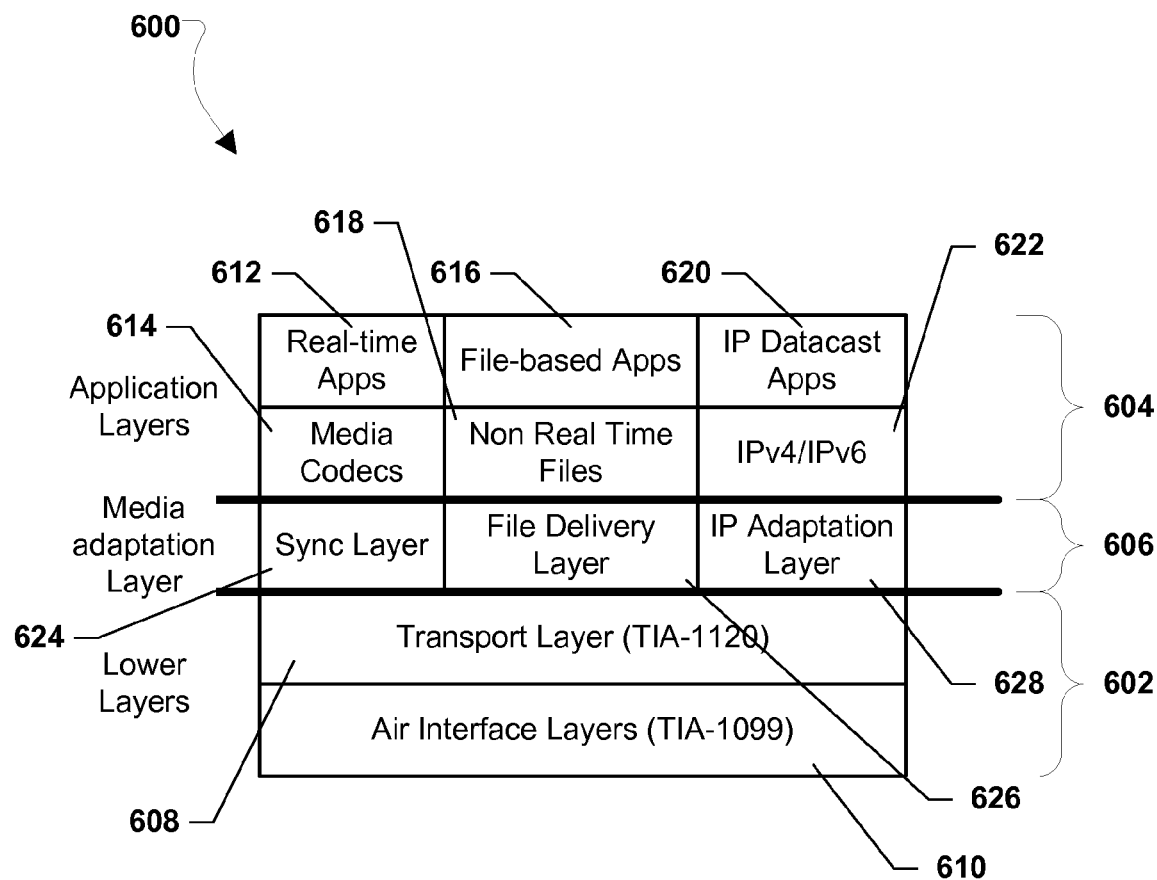
FIG. 6 is a protocol stack diagram illustrating a content delivery protocol stack for a mobile broadcast system.

More details regarding the adaptation layer and interactions with various service layers are illustrated in FIG. 6 which depicts a content delivery protocol stack 600 that may be implemented in a broadcast server and receiving devices. As shown, the content delivery protocol stack 600 may include one or more distribution layers 602 and one or more application layers 604. A media adaptation layer 606 may adapt content passing between the distribution layers 602 and the application layers 604 on the receiver side, and between the application layer 604 in the distribution layers 602 on the broadcast side.

As shown in FIG. 6, the distribution layers 602 may include, for example, a transport layer 608 and an air interface layer 610. The transport layer 608 may be any known transport layer, such as the Telecommunications Industry Association ("TIA") 1120 (i.e., TIA-1120) transport layer, for example. Further, the air interface layer 610 may be any known physical layer, such as the TIA-1099 air interface layer.

As shown in FIG. 6, the application layers 604 may include one or more real-time applications 612, one or more media codecs 614, one or more file-based applications 616, and one or more non-real-time files 608. Additionally, the application layers 604 may include one or more IP datacast applications 620 and an IP network layer 622. For example, the IP network layer 622 may be an IP version four ("IPv4"), IP version six ("IPv6"), another IP network layer well known in the art, or any combination thereof.

FIG. 6 further shows that the media adaptation layer 606 may include a synchronization ("sync") layer 624, a file delivery layer 626, and an IP adaptation layer 628. The synchronization ("sync") layer 624 may provide synchronization adaptation functionality to enable real-time applications 612 to receive and process real-time content from the distribution layers 602. The file delivery layer 626 may include file management and adaptation functionality to enable file-based applications 616 to receive non-real-time files from the distribution layers 602. The IP adaptation layer 628 provides packet encapsulation or recovery to enable IP applications, such as IP datacast applications 620, to process IP data received from the distribution layers 602. The media adaptation layer 606 may be operable to execute one or more of the methods described herein in order to allow DVB-IPDC services, OMA BCAST services, or other services to operate in conjunction with MediaFLO services over a FLO network.

Figure 7:
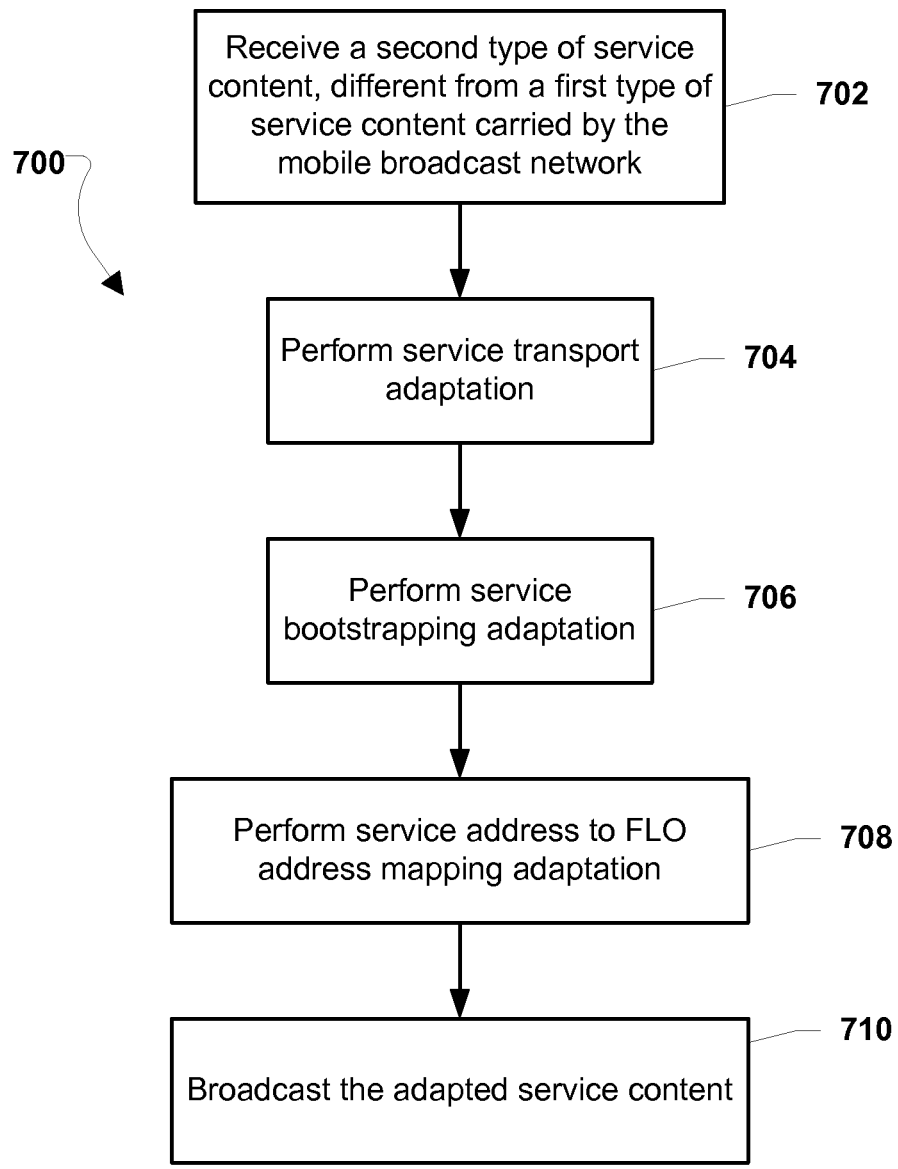
FIG. 7 is a process flow diagram illustrating a general method for adapting broadcast services for transmission over a mobile broadcast network.

A general method 700 for adapting broadcast services for transport over a FLO network is shown in FIG. 7. Commencing at block 702, a server 124 within a mobile broadcast network, e.g., a FLO network, that carries a first type of service content, e.g., MediaFLO service content, may receive for broadcast a second type of service content (e.g., DVB-IPDC service content or OMA BCAST service content) that is different from the first type of service content. More particularly, the second type of service content is incompatible with the first mobile broadcast network. At block 704, a FLO adaptation layer implemented within the broadcast server 124 may perform service transport adaptation, according to one or more of the methods described herein. This service transport adaptation adapts the received second type of service content so that it is in a form that can be carried over the mobile broadcast network. At block 706, the FLO adaptation layer may adapt service bootstrapping information for transport over the mobile broadcast network according to one or more of the methods described herein. Further, at block 708, the FLO adaptation layer may perform service address to FLO address mapping adaptation according to one or more of the methods described herein. At this point the second type of service content is ready for transport via the mobile broadcast network, so at block 710 the adapted service stream is broadcasted over the mobile broadcast network. It should be noted that the order in which the blocks appear in FIG. 7 is arbitrary and does not reflect a particular order in which service content may be processed by an adaptation layer. For example, service content and bootstrapping information may be broadcasted concurrently, so blocks 704-708 may be performed concurrently or in a different order from that shown in FIG. 7.

Figure 8:
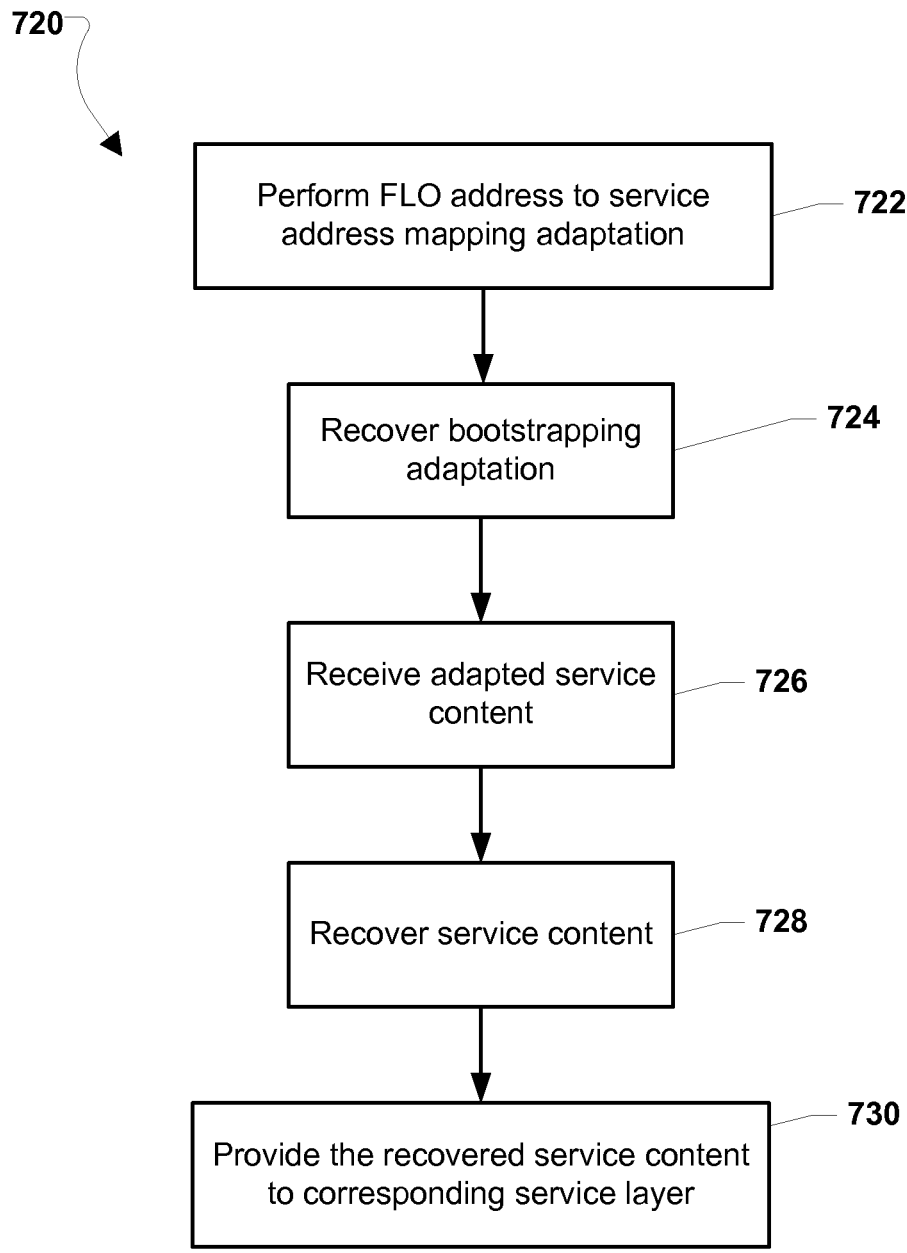
FIG. 8 is a process flow diagram illustrating a general method for receiving adapted broadcast services from a mobile broadcast network.

In a similar manner, an adaptation layer implemented within a receiving device processor receives adapted service stream from the broadcast distribution layer and formats the information into a form that can be used by the corresponding service layer. A general method 720 for recovering the service content within a receiving device is illustrated in FIG. 8. At block 722, an adaptation layer within the protocol stack implemented in the receiving device processor may translate the FLO address to the service address that is expected by the corresponding service layer in order to determine the correct address on which to receive the adapted service content. At block 724, the adaptation layer may recover bootstrapping information from the adapted bootstrapping information content. For example, this process may involve reformatting the service guide information into a format compatible with the corresponding service layer. At block 726, the adaptation layer may receive the adapted service content from the broadcast distribution layer. The adaptation layer may then recover the service content from the adapted service content at block 728. For example, this process may involve recovering service content packets from encapsulated packets used to transport the information over the broadcast network. As the service content is recovered from the received adapted service content, the information may be provided to the corresponding service layer at block 730. It should be noted that the order in which the blocks appear in FIG. 8 is arbitrary and does not reflect a particular order in which service content may be processed by an adaptation layer. For example, service content and bootstrapping information may be broadcasted concurrently, so blocks 722-728 may be performed concurrently or in a different order from that shown in FIG. 8.

Figure 9:
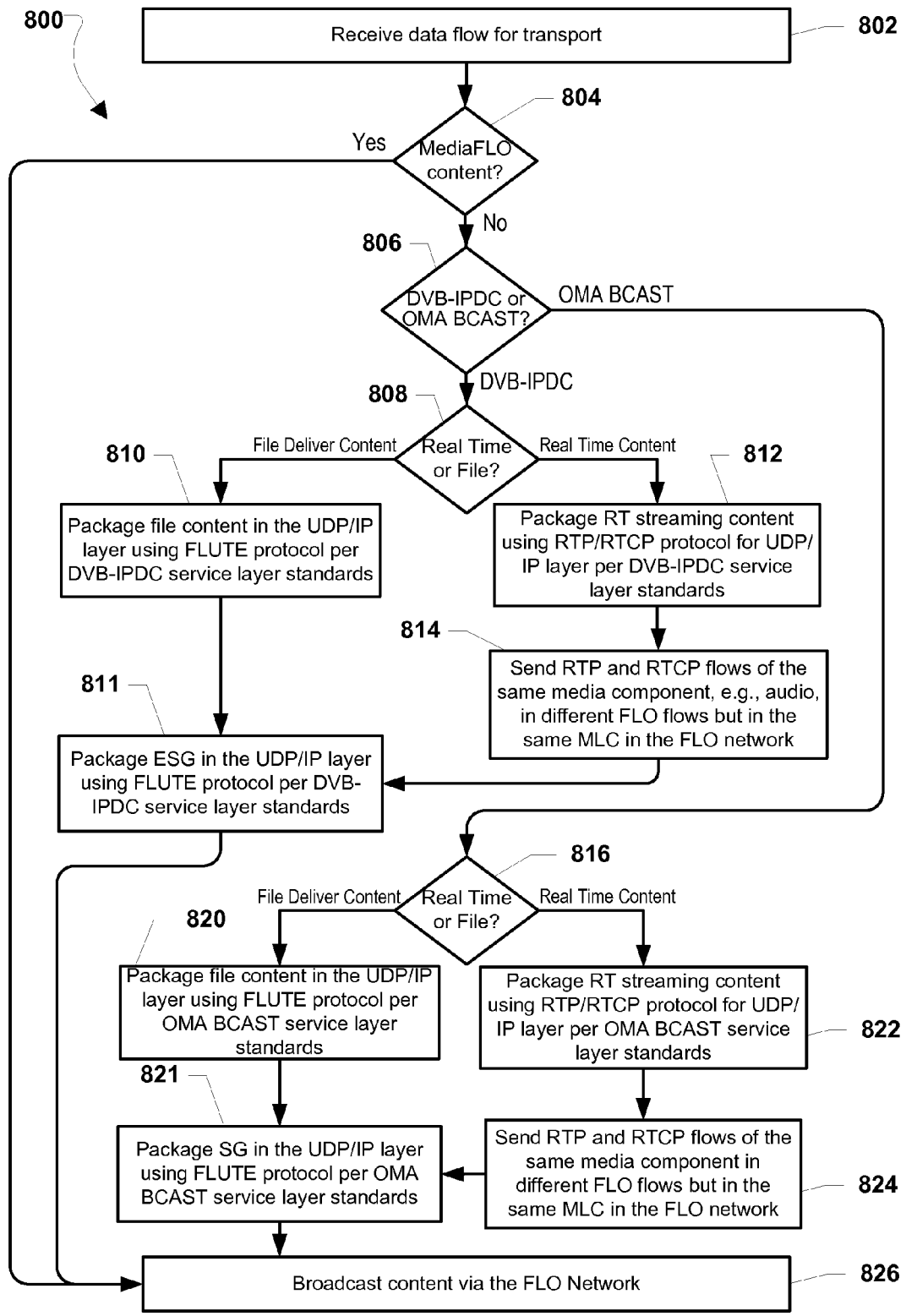
FIG. 9 is a process flow diagram illustrating a method of service transport adaptation in a mobile broadcast network.

FIG. 9 illustrates a method 800 of service transport adaptation suitable for use in a FLO network. This method 800 enables transporting all data flows of a broadcast service layer, including the service guide or ESG, over an IP layer in a FLO network. If the service content to be carried over a FLO network is DVB-IPDC service content, the service content and the electronic service guide (ESG) information are carried by the FLO network over the IP adaptation layer as MediaFLO IPDS services, such as using the file delivery layer 626 illustrated in FIG. 6. If the service content is OMA BCAST to be carried over a FLO network, the service content and the service guide (SG) information are carried by the FLO network as MediaFLO IPDS services. Beginning at block 802, the FLO adaptation layer may receive service content for transport over the FLO network. At decision block 804, the FLO adaptation layer may determine whether the content flow is MediaFLO content, in which case no adaptation is required so the received service content is provided to the distribution layer for broadcast without adaptation ad block 826.

If the received service content is not MediaFLO content (i.e., decision block 804="No"), at decision block 806, the FLO adaptation layer may determine whether the service content is DVD-IPDC service content or OMA BCAST service content. If the service content is DVD-IPDC format, method 800 at decision block 808 the FLO adaptation layer may determine whether the service content is real time content or file transfer type content.

If the service content is determined to be file transfer type content, at block 810, the FLO adaptation layer may package the file delivery content portion of the service content using the file delivery over unidirectional transport ("FLUTE") protocol for transmission over the user datagram protocol/Internet protocol ("UDP/IP") layer per the DVB-IPDC service layer standards. Similarly, at block 811, the FLO adaptation layer may package the Electronic Service Guide (ESG) portion of the service content using the FLUTE protocol for transmission over the UDP/IP layer per the DVB-IPDC service layer standards. In this process, the DVB-IPDC file content packets may be encapsulated within UDP/IP data packets so they can be carried by the FLO network and broadcasted to receiver devices as IP data. Packaged file transfer content and ESG content are then broadcast via the FLO network at block 826.

If the service content is determined to be real time type content, at block 812, the FLO adaptation layer may package the real time streaming content using real-time transport protocol/real-time transport control protocol ("RTP/RTCP") for transmission over the UDP/IP layer per the DVB-IPDC service layer standards. At block 814, the FLO adaptation layer may send the RTP and RTCP flows of the same media component, e.g., audio, in different FLO flows but in the same MediaFLO Logic Channel ("MLC") in the FLO network. Different media components, e.g., audio and video, may be sent on different MLCs. As above, at block 811, the FLO adaptation layer may package the ESG portion of the service content using the FLUTE protocol for transmission over the UDP/IP layer per the DVB-IPDC service layer standards. Packaged real time content and ESG content are then broadcast via the FLO network at block 826.

Returning to decision step 806, if the service content is determined to be OMA BCAST service content, at decision block 816, the FLO adaptation layer may determine whether the service content is real time content or file transfer type content. If the service content is determined to be file transfer type content, at block 820, the FLO adaptation layer may package the file delivery content portion of the service content using the FLUTE protocol for transmission over the UDP/IP layer per the OMA BCAST service layer standards.

Similarly, at block 811, the FLO adaptation layer may package the Service Guide (SG) portion of the service content using the FLUTE protocol for transmission over the UDP/IP layer per the OMA BCAST service layer standards. In this process, the OMA BCAST file content and SG packets may be encapsulated within UDP/IP data packets so they can be carried by the FLO network and broadcasted to receiver devices as IP data. Packaged file transfer content and SG content are then broadcast via the FLO network at block 826.

If the service content is determined to be real time type content, at block 822, the FLO adaptation layer may package the real time streaming content using RTP/RTCP protocol over the UDP/IP layer for RT streaming content per the OMA BCAST service layer standards. At block 824, the FLO adaptation layer may send the RTP and RTCP flows of the same media component, e.g., audio, in different FLO flows but in the same MLC in the FLO network. Different media components, e.g., audio and video, may be sent on different MLCs. As above, at block 821, the FLO adaptation layer may package the SG portion of the service content using the FLUTE protocol for transmission over the UDP/IP layer per the OMA BCAST service layer standards. Packaged real time content and SG content are then broadcast via the FLO network at block 826.

Figure 10:
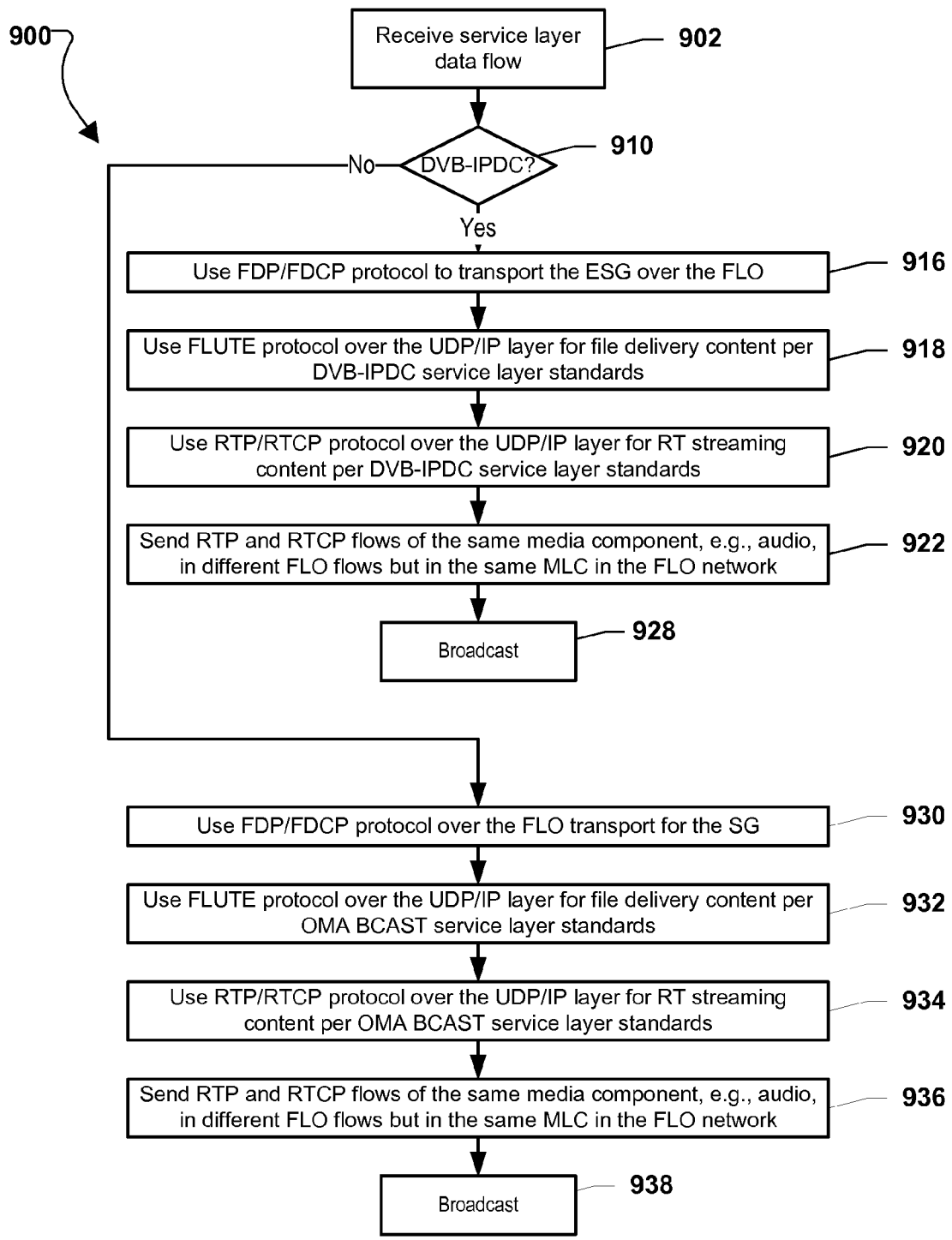
FIG. 10 is a process flow diagram illustrating a method of service transport adaptation in a mobile broadcast network.

FIG. 10 illustrates a method 900 of service transport adaptation suitable for use in a FLO network. This method enables transporting data flows of broadcast services, excluding the service guide (SG) or ESG information, over the IP layer delivered as MediaFLO IPDS services in the FLO network. The service guide (SG) or ESG data of the broadcast service is delivered as File Delivery Services in the FLO network, such as using the File Delivery Layer 626 illustrated in FIG. 6. The service guide (SG) or ESG data of the broadcast service may be sent as one or more files belonging to one or more File Delivery services in the FLO network. If the service content to be carried over a FLO network is DVB-IPDC service content, the service content is carried by the FLO network as MediaFLO IPDS services, and the ESG information is carried by the FLO network as File Delivery service. If the service content is OMA BCAST to be carried over a FLO network, the service content is carried by the FLO network as MediaFLO IPDS services, and the SG information is carried by the FLO network as a File Delivery service.

Referring to FIG. 10, in method 900 at block 902, a FLO adaptation layer may receive a service layer data flow for via a FLO network. At decision block 910, the FLO adaptation layer may determine whether the service content is DVB-IPDC or OMA BCAST. If the service layer is DVB-IPDC, at block 916, the FLO adaptation layer may use the file delivery protocol/file delivery control protocol ("FDP/FDCP") to transport the ESG over the FLO network. Also, at block 918, the FLO adaptation layer may use FLUTE protocol to transport file delivery content over the UDP/IP layer per the DVB-IPDC service layer standards. At block 920, the FLO adaptation layer may use the RTP/RTCP protocol to transport real time (RT) streaming content over the UDP/IP layer per DVB-IPDC service layer standards, and at block 922, the FLO adaptation layer may send RTP and RTCP flows of the same media component, e.g., audio, in different FLO flows but in the same MLC in the FLO network. Different media components, e.g., audio and video, may be sent on different MLCs. Such adapted DVB-IPDC content is then broadcasted via the FLO network at block 928.

If the service content is OMA BCAST, at block 930, the FLO adaptation layer may use the FDP/FDCP protocol to transport the service guide (SG) over the FLO transport. At block 932, the FLO adaptation layer may use the FLUTE protocol for transporting file delivery content over the UDP/IP layer per the OMA BCAST service layer standards. At block 934, the FLO adaptation layer may use RTP/RTCP protocol for transporting RT streaming content over the UDP/IP layer per the OMA BCAST service layer standards. Additionally, at block 936, the FLO adaptation layer may send RTP and RTCP flows of the same media component, e.g., audio, in different FLO flows but in the same MLC in the FLO network. Different media components, e.g., audio and video, may be sent on different MLCs. Such adapted DVB-IPDC content is then broadcasted via the FLO network at block 938.

When the FDP/FDCP layer is used to transport ESG or SG data in a FLO network, FDP/FDCP flows may be used exclusively to carry different ESG/SG data. Further, when the FDP/FDCP layer is used to transport ESG or SG data in a FLO network, the file_transport_id of the FDP/FDCP protocol may be used to identify the service layer ESG or SG files sent over the FDP/FDCP flows.

Some examples for using the file_transport_id to indicate the DVB-IPDC ESG or OMA BCAST SG files in a data flow are given below:

When a data flow carries an ESG bootstrap session, well-known (i.e., commonly used) file transport identifiers (IDs) may be used to identify ESG bootstrap descriptors, respectively. For example, file_transport_id "0" may be used for the ESGProviderDescriptor and file_transport id "1" may be used for the ESGAccessDescriptor.

When a data flow carrying an ESG bootstrap session, well-known file transport IDs may be used to identify ESG bootstrap descriptors, respectively. For example, file_transport_id "0" may be used for the ESGProviderDescriptor and file_transport id "1" may be used for the ESGAccessDescriptor.

When a data flow carries an ESG bootstrap session, well-known file transport ids may be used to identify ESG bootstrap descriptors, respectively. For example, file_transport_id "0" may be used for the ESGProviderDescriptor and file_transport id "1" may be used for the ESGAccessDescriptor.

When a data flow carries an ESG announcement carousel session, an ESG container ID may be used as the file_transport_id. It should be noted that the container ID for the ESG init container is always "1."

When a data flow carries an ESG fragment session, an ESG container ID may be used as the file transport_id.

When a data flow carries an SG announcement session, a SG Delivery Descriptor ("SGDD") ID may be used as the file_transport_id.

When a data flow carries a SG Data Unit ("SGDU") session, a SGDU ID may be used as the file transport_id.

When the FDP/FDCP layer is used to transport ESG data for the DVB-IPDC service layer in a FLO network, in-line session description protocol ("SDP") may be used for the ESG.

When the FDP/FDCP layer is used to transport out of band SDP for the DVB-IPDC service layer in a FLO network, the uniform resource identifier ("URI") of the SDP announced in the corresponding ESG fragments may indicate, or otherwise convey, the FDP/FDCP transport ID information of the SDP.

When the FDP/FDCP layer is used to transport SG data for the OMA BCAST service layer in a FLO network, in-line SDP may be used for the SG.

When the FDP/FDCP layer is used to transport out of band SDP for the OMA BCAST service layer in a FLO network, the URI of the SDP announced in the corresponding SG fragments may indicate, or otherwise convey, the FDP/FDCP transport ID information of the SDP.

When the FDP/FDCP layer is used to transport SG or ESG data for the service layer in a FLO network, the FLO network address (e.g., a flow ID) for of a FDCP flow may be derived from the FLO network address (e.g., a flow ID) of the corresponding FDP flow. For example, the FDCP network address (e.g., a flow ID) may be derived as the FDP network address (e.g., a flow ID)+1.

When the FDP/FDCP layer is used to transport out of band SDP for the service layer SG or ESG in a FLO network, the FLO network address (e.g., a flow ID) for of a FDCP flow may be derived from the FLO network address (e.g., a flow ID) of the corresponding FDP flow. For example, the FDCP network address (e.g., a flow ID) may be derived as the FDP network address (e.g., a flow ID)+1.

The foregoing methods may be implemented in one or more servers on the broadcast side of a mobile broadcast network. For example, the functionality of the foregoing methods may be implemented in a single distribution server, such as the broadcast server 124 illustrated in FIG. 1. Alternatively, the functionality of the foregoing methods may be implemented in two or more servers, such as the content server 122 and broadcast server 124 illustrated in FIG. 1.

In order to deliver different types of service content over a mobile broadcast network by adapting the content for transport, the receiving devices must be able to discover the service content that can be received and determine where (i.e., which data flow to monitor) to receive the adapted service content. The process by which a receiving device discovers the services available in a broadcast network is called "service discovery." Service discovery includes receiving the bootstrap information, which the receiver device uses to build up a director of available broadcast services, and discovery the data flow addresses for each of the data flows of the available broadcast services. Since the process of adapting different service content for delivery over a mobile broadcast packages the service guide and bootstrapping information and may change data flow addresses, the service guide and bootstrapping information needs to be conveyed in a manner that can be accessed and the receiving devices must be configured to recover this information from the adapted service content.

As a part of the service discovery process, the first service layer information a device acquires after it acquires the broadcast distribution network signal is called the service bootstrap information. Examples of the service bootstrap information may include the ESG bootstrap descriptors for a DVB-IPDC service layer, service guide delivery descriptors for an OMA BCAST service layer, and the primary message in a Media-FLO service layer. The process by which a receiving device acquires the service bootstrap information in a broadcast distribution network is called service bootstrapping. Various methods for discovering the service bootstrapping information in a FLO network for other types of service layers are described below.

In a FLO network the data flows coming from the service layer may be carried by FLO flows and grouped into Media-FLO Logic Channels (MLCs). Each data flow carried in a FLO network may be uniquely addressed by a corresponding FLO network address (e.g., a flow ID). A receiving device that is capable of receiving FLO broadcast signals may identify the data flows carried in the FLO signal by FLO network address (e.g., a flow ID). As a part of the service discovery process, for each service layer data flow carried in the FLO network, the receiving devices may discover the corresponding ID of the FLO flow that carries the service layer data flow. The following methods encode the service guide and bootstrapping information in a manner that enables receiver devices to discover the mapping between the service layer address and the FLO address for each service layer data flow carried in the FLO network.

Figure 11:
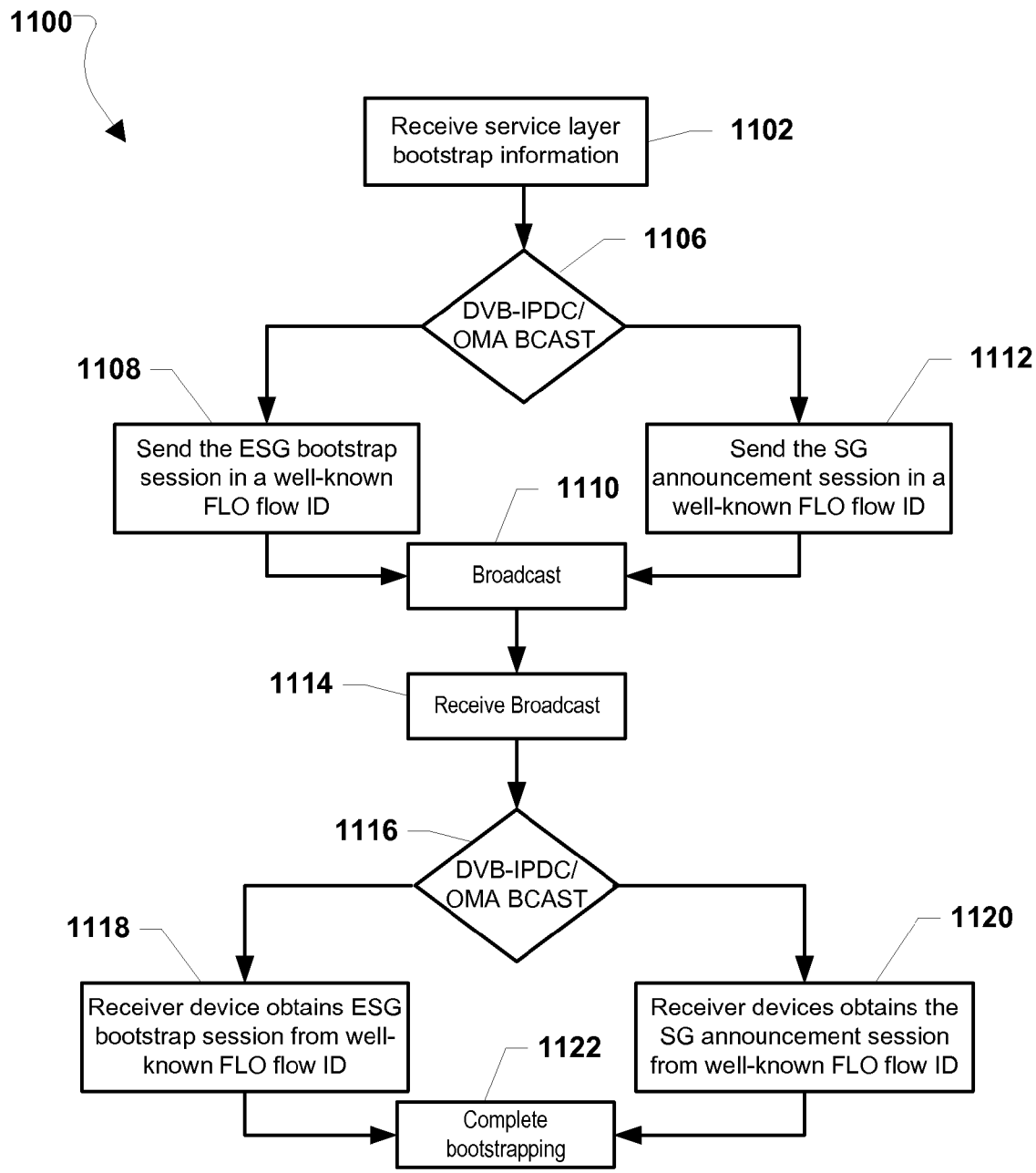
FIG. 11 is a process flow diagram illustrating a method of service bootstrapping in a mobile broadcast network.

The service bootstrap information may be sent on one or more of the well-known FLO network addresses (e.g., a flow IDs). This enables the receiving devices to directly access the well-known ID flows in the FLO network to discover the broadcast services available. Well-known FLO network addresses (e.g., a flow IDs) are network address (e.g., a flow ID) numbers that are known to both server and the receiver devices. Referring now to FIG. 11, a method of transporting and discovering service bootstrapping in a FLO network is generally designated 1100. At block 1102, a FLO adaptation layer may receive service content, including service layer bootstrap information, for transport via the FLO network. At decision block 1106, the FLO adaptation layer may determine whether the service content is DVB-IPDC or OMA BCAST. If the service layer is DVB-IPDC, to block 1108 the FLO adaptation layer may send the ESG bootstrap session in a well-known FLO network address (e.g., a flow ID), and broadcast the adapted information via the FLO network at block 1110.

If the service content is OMA BCAST, at block 1112 the FLO adaptation layer may send the SG announcement session in a well-known FLO network address (e.g., a flow ID), and broadcast the adapted information via the FLO network at block 1110.

At block 1114, a receiving device may receive the adapted broadcasted bootstrap information. An adaptation layer within the receiving device may then determine whether the received broadcast contains DVB-IPDC or OMA BCAST service content at decision block 1116. If the received broadcast contains DVB-IPDC service content, at block 1118 the adaptation layer within the receiving device may obtain the ESG bootstrap session from the well-known FLO network address (e.g., a flow ID), and use that information to complete the bootstrapping process at block 1122. If the received broadcast contains OMA BCAST service content, at block 1120 the adaptation layer within the receiving device may obtain the SG announcement session from the well-known FLO network address (e.g., a flow ID), and use that information to complete the bootstrapping process at block 1122. Since the ESG bootstrap session and the SG announcement session may both be transmitted on a well-known FLO network address (e.g., a flow ID), decision block 1116 may be optional since reception of the bootstrapping information will inform the adaptation layer of the type of service content being received.

Figure 12:
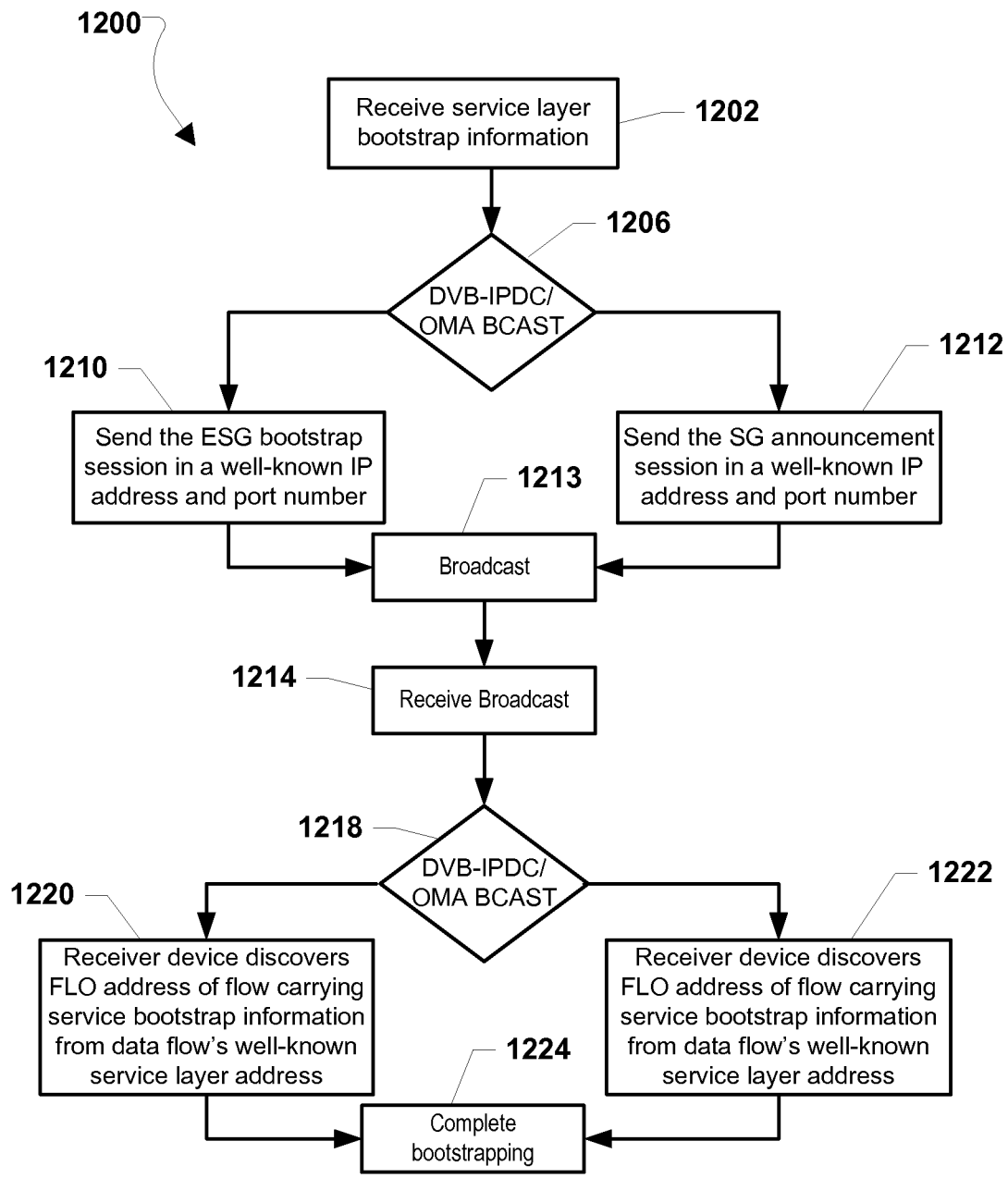
FIG. 12 is a process flow diagram illustrating a method of service bootstrapping in a mobile broadcast network.

In a method illustrated in FIG. 12, a FLO adaptation layer may send the service bootstrap information on one or more well-known service layer addresses. The FLO adaptation layer may provide a FLO address of the flow carrying the service bootstrap information to allow a receiving device to discover the FLO address from the data flow's well-known service layer address.

Referring to FIG. 12, in method 1200 at block 1202, a FLO adaptation layer may receive service content, including service layer bootstrap information, for transport via the FLO network. At decision block 1206, the FLO adaptation layer may determine whether the service content is DVB-IPDC or OMA BCAST. If the service layer is DVB-IPDC, at block 1210 the FLO adaptation layer may send the ESG bootstrap session over the FLO network in a well-known IP address and port number. The adapted ESG bootstrap session may then be broadcasted via the FLO network at block 1213.

If the service content is OMA BCAST, at block 1212 the FLO adaptation layer may send the SG announcement session in a well-known IP address and port number. The adapted SG announcement session may then be broadcasted via the FLO network at block 1213.

At block 1214, a receiving device may receive the adapted broadcasted bootstrap information. An adaptation layer within the receiving device may then determine whether the received broadcast contains DVB-IPDC or OMA BCAST service content at decision block 1218. If the received broadcast contains DVB-IPDC service content, at block 1220 the adaptation layer within the receiving device may discover the flow carrying service bootstrap information from the data flow's well-known service layer address, and use the discovered information to complete the bootstrapping process at block 1224. If the received broadcast contains OMA BCAST service content, at block 1222 the adaptation layer within the receiving device may discover the FLO address of the data flow carrying service bootstrap information from the data flow's well-known service layer address, and use the discovered information to complete the bootstrapping process at block 1224. Since the bootstrap information is discovered on the data flow's well-known service layer address, decision block 1218 may be optional since the adaptation layer can simply test the various service layer addresses and be informed of the type of service content being received based upon the service layer address that contains the information.

Figure 13:
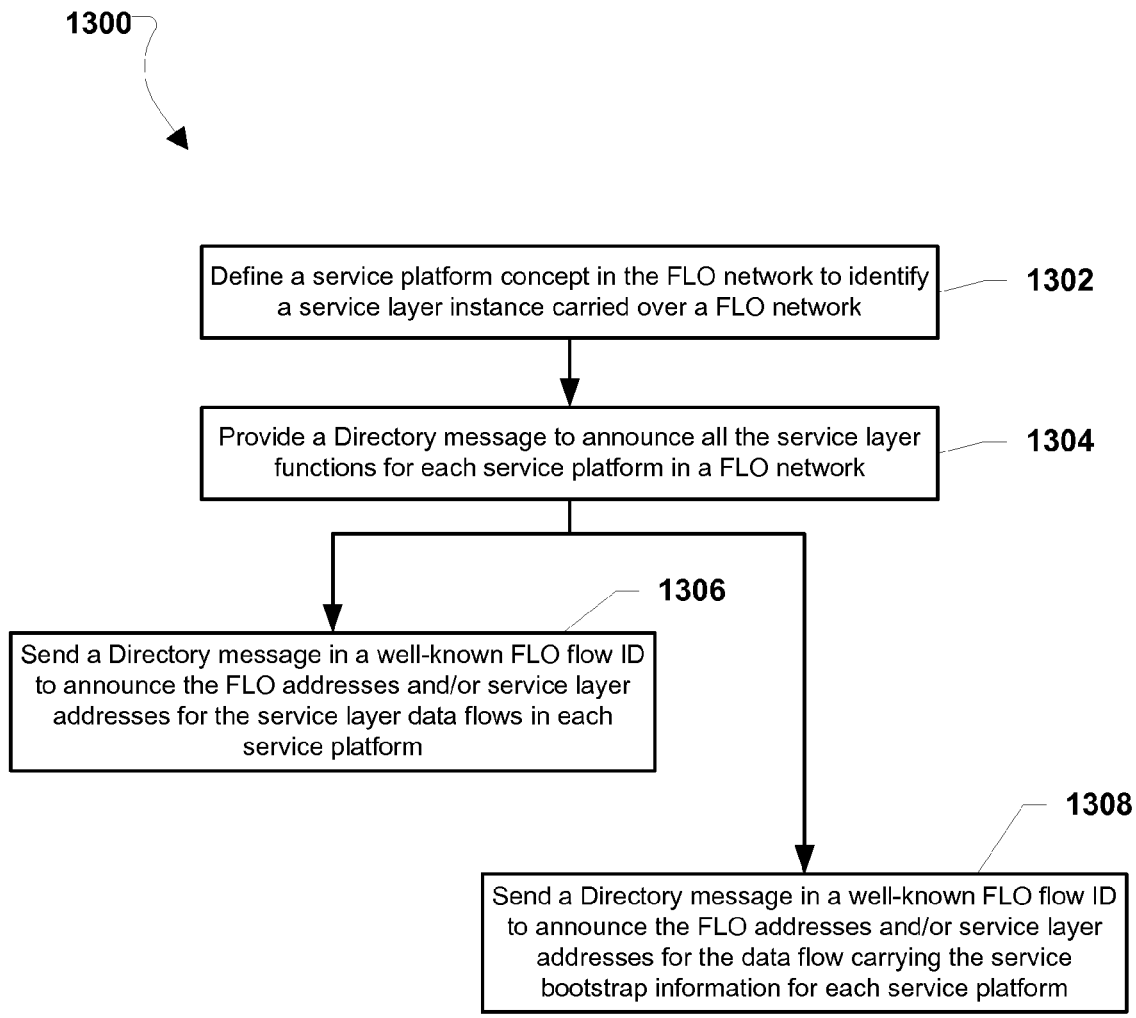
FIG. 13 is a process flow diagram illustrating a method of service bootstrapping in a mobile broadcast network.

FIG. 13 illustrates a method 1300 of adapting service bootstrapping information for transport in a FLO network. At block 1302, the FLO adaptation layer may define a service platform concept in the FLO network to identify a service layer instance carried over a FLO network. A service platform is an abstraction on top of the flow network allowing the carrying of multiple content groups or carriers, similar to a name space within a naming system. For example, a service platform may be defined for each of the different service carriers. Within each service platform, each service carrier may use addresses unique to their domain. Defining a service platform for a type of service layer enables use of the addressing structures, administration and content flows of that type of service layer. An "instance" is a specific data or implementation of a service. For example, the service guide may have different instances for different regions reflecting content and scheduling unique to the region.

At block 1304, the FLO adaptation layer may provide a directory message to announce all the service layer functions for each service platform in a FLO network. At block 1306, the FLO adaptation layer may send the directory message in a well-known FLO network address (e.g., a flow ID) to announce the FLO addresses, service layer addresses, or a combination thereof, for the service layer data flows in each service platform. Alternatively, at block 1308, the FLO adaptation layer may send the directory message in a well-known FLO network address (e.g., a flow ID) to announce the FLO addresses, service layer addresses, or a combination thereof, for the data flow carrying the service bootstrap information for each service platform. A receiving device may then recover the directory message from the well-known FLO network address (e.g., a flow ID) and use the information contained therein to obtain the FLO addresses, service layer addresses to obtain the service bootstrap information for each service platform, and complete the bootstrap process based upon that information.

Figure 14:
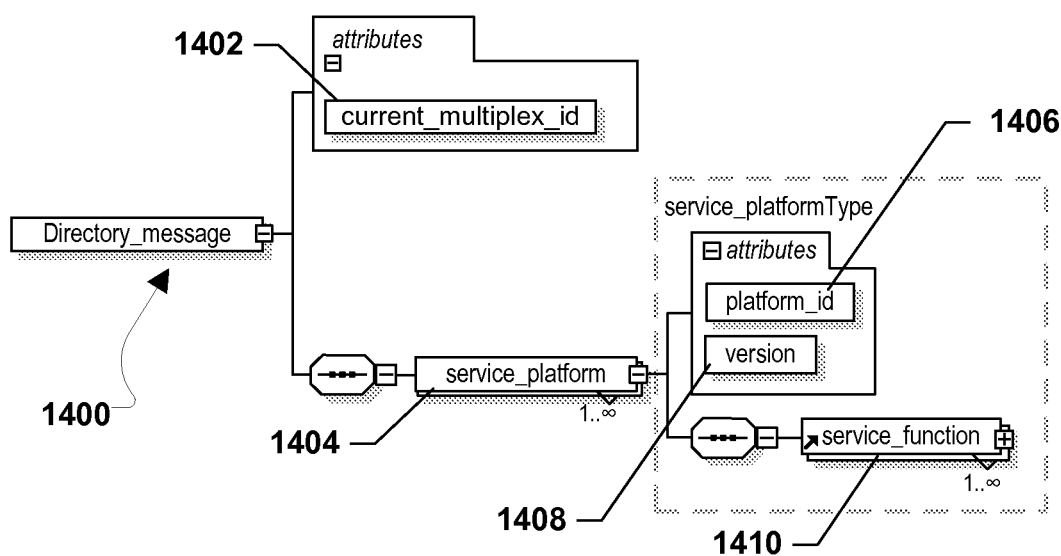
FIG. 14 is an XML schema diagram of a directory message.

FIG. 14 is a data structure diagram of a directory message, generally designate 1400. In FIG. 14 the directory message 1400 is presented in an extensible markup language ("XML") diagram. The directory message 1400 may include, or otherwise indicate, a current multiplex ID field 1402 and a service platform field 1404. The current multiplex ID field 1402 may include, or otherwise define, the ID of the multiplex in FLO network that is carrying the directory message. It is to be understood that a multiplex in a FLO network may be defined as a group of services delivered over a same coverage area.

As shown in FIG. 14, the service platform field 1404 may include information for each service platform in the system. In a particular aspect, a multiplex in a FLO network may carry any subset of the services in a service platform. Further, in a particular aspect, a multiplex in a FLO network may carry services from multiple service platforms. The service platform field 1404 may include a platform ID field 1406, a version field 1408, and a service function field 1410. The platform ID field 1406 may include, or otherwise define, an ID of the service platform. The version field 1408 may include, or otherwise define, a version of the service function information within the service platform 1404. Further, the service function field 1410 may include, or otherwise define, information for each service layer function in the service platform, e.g., the ESG in a DVB-IPDC service platform.

Figure 15:
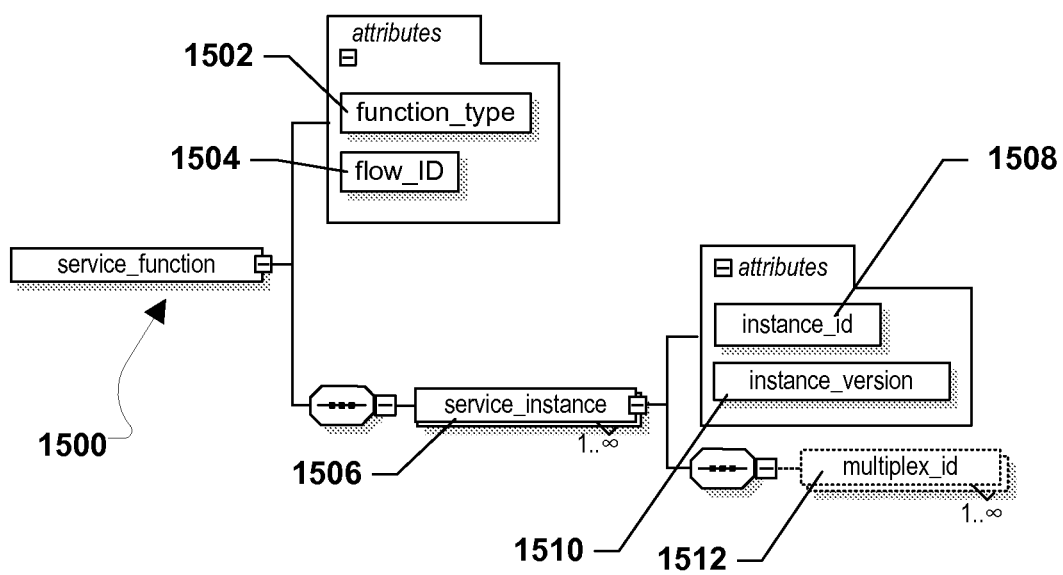
FIG. 15 is an XML schema diagram of a service function of a directory message.

FIG. 15 is an XML schema diagram of an exemplary, non-limiting aspect of a service function field that may be used in conjunction with the directory message of FIG. 14. As illustrated in FIG. 15, the service function 1500 may include a function type field 1502, a network address (e.g., a flow ID) field 1504, a service instance field 1506, an instance ID field 1508, an instance version field 1510, and a multiplex ID field.

In a particular aspect, the function type field 1502 may include, or otherwise define, a type of the service function. Exemplary non-limiting function types may include Media-FLO SI (type 1); BCAST SG (type 2); DVB-IPDC ESG: (type 3). The network address (e.g., a flow ID) field 1504 may include, or otherwise define, an ID of the flow that carries the service function in the FLO network. Further, the service instance field 1506 may include, or otherwise define, an instance of the service function. It is to be understood that a service function in a service platform may have multiple instances in the FLO network, e.g., different ESG instances in different multiplexes. In a particular aspect, the instance ID field 1508 may include, define, or otherwise indicate, an ID of the service instance shared by a group of multiplexes. Moreover, the instance version field 1510 may include, or otherwise indicate, the version of the service instance. Further, the multiplex ID field may provide, or otherwise indicate, a list of multiplexes that share the same service instance. In a particular aspect, an empty list may mean that all multiplexes in the system share the same service instance.

The XML schema diagrams shown in FIGS. 14 and 15 are illustrative examples of data structures for transmitting directory and service function messages. Other data structures may be used for this purpose, including, for example, data tables and data lists.

In a particular aspect, when a directory message is used, the service bootstrapping process may include the following steps. First, a receiver device may acquire the directory message from the well-known network address (e.g., a flow ID). From the directory message, the receiver device may discover which service platform the device is associated with and the service functions that are available in the associated service platform. For each function, e.g., service bootstrap function, the receiver device may determine the service instance (i.e., ID and version) available in the current multiplex and the receiver device may access the service instance via the announced FLO address or service layer address in the service function element. If the service layer address is provided in the directory message, the receiver device may first discover the FLO address from the provided service layer address before it may access the service instance.

In a particular aspect, the directory message may be used by the receiving device to detect new service functions in the service platform or check for updates to the existing service functions. In order to detect new service functions in the service platform or check for updates to the existing service functions, e.g., an ESG update, an exemplary service update monitoring process at a receiver device may be provided. During the service update monitoring process, the receiver device may monitor the directory message, e.g., periodically. If the current multiplex ID and the version of the associated service platform remain the same in the directory message, no action may be required. Otherwise, if a new service function is announced in the service platform, the receiver device may acquire the service instance available in the current multiplex. For each existing service function, if the service instance available in the current multiplex changes, i.e., either instance ID or version, the receiver device may re-acquire the service function via the announced network address (e.g., a flow ID) in the current multiplex. Otherwise, no action may be required by the receiver device.

In a particular aspect, if the service layer is DVB-IPDC, the FLO address or the service layer address for the data flow carrying the ESG bootstrap session may be announced in the directory message. In another aspect, if the service layer is the OMA BCAST, the FLO address or the service layer address for the data flow carrying the SG announcement session may be announced in the directory message.

As mentioned above, as part of the service discovery process, a receiver device may need to discover the FLO address for a data flow from its service layer address. Three alternative methods for discovering the FLO address are described below with reference to FIGS. 16, 17 and 18.

Figure 16:
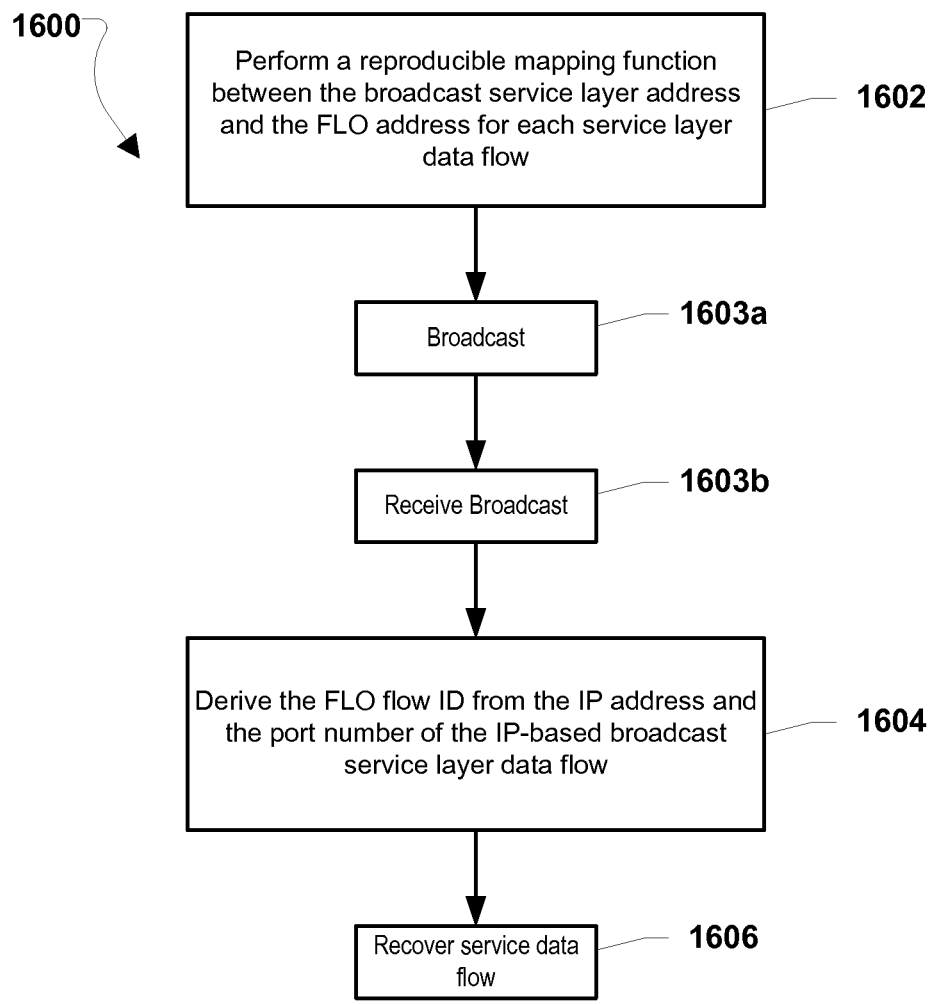
FIG. 16 is a process flow diagram illustrating a method of service layer address to mobile broadcast address mapping.

FIG. 16 illustrates a first method by which a receiving device can discover the service layer address to FLO address mapping, generally designated 1600. Commencing at block 1602, a FLO network head-end system, e.g., a FLO adaptation layer therein, may locally perform a reproducible mapping function between the broadcast service layer address and the FLO address for each service layer data flow and broadcast the adapted service layer at block 1603a. A receiving device may receive the broadcasted adapted service layer at block 1603a and derive the FLO network address (e.g., a flow ID) from the IP address and the port number of an IP-based broadcast service layer data flow. Using the received information the receiving device may recover the service data flow at block 1606. Similar to the head-end system, the receiver device derives the FLO network address (e.g., a flow ID) by locally performing a reproducible mapping function between the broadcast service layer address and the FLO address for each service layer data flow.

Performing a reproducible mapping function between the broadcast service layer address and the FLO address for each service layer data flow may be accomplished according to the following example algorithm:

Input: <IP multicast address, port>
Output: FLO network address (e.g., a flow ID)

Algorithm: FLO network address (e.g., a flow ID)=
        [UDP port number–base port number]+shift bits
        of [IP address–base IP address] left by distance 4
        while filling with 0 bits on the right side.

After the FLO network address (e.g., a flow ID) is derive, as described, the receiving device may recover the service data flow at block 1606.

Figure 17:
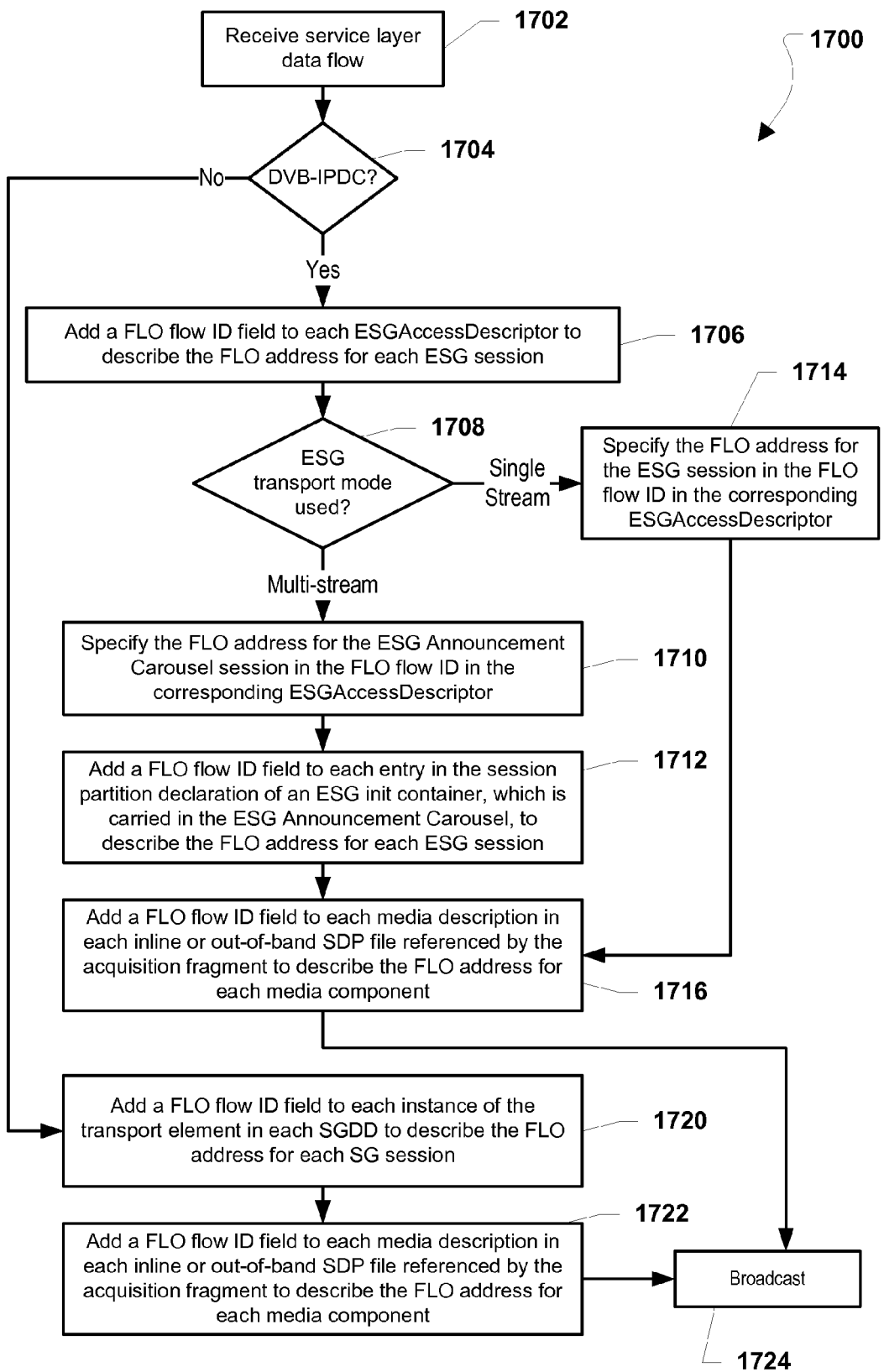
FIG. 17 is a process flow diagram illustrating a method of service layer address to mobile broadcast address mapping.

FIG. 17 illustrates a second method by which a receiving device can discover the, generally designated 1700. In this method, the FLO adaptation layer within the head-end system may add the corresponding FLO network address (e.g., a flow ID) of each service layer data flow to the service layer information that describes the service layer data flows. Beginning at block 1702, the FLO adaptation layer within the head-end system may receive a service layer data flow for transmission via the FLO network. At decision block 1704, the FLO adaptation layer may determine whether the received service content is DVB-IPDC. If so, at block 1706 the FLO adaptation layer may add a FLO network address (e.g., a flow ID) field to each ESGAccessDescriptor to describe the FLO address for each ESG session.

Moving to decision block 1708, the FLO adaptation layer may determine the type of ESG transport mode that is to be used: multi-stream or single stream. If the multi-stream ESG transport mode is used, at block 1710 the FLO adaptation layer may specify the FLO address for the ESG Announcement Carousel session in the FLO network address (e.g., a flow ID) in the corresponding ESGAccessDescriptor. Thereafter, at block 1712, the FLO adaptation layer may add a FLO network address (e.g., a flow ID) field to each entry in the session partition declaration of an ESG init container, which is carried in the ESG Announcement Carousel, to describe the FLO address for each ESG session. At block 1716, the FLO adaptation layer may add a FLO network address (e.g., a flow ID) field to each media description in each inline or out-of-band SDP file referenced by the acquisition fragment to describe the FLO address for each media component. Thereafter, the adapted service layer data may be broadcasted at block 1724.

Returning to decision block 1708, if FLO adaptation layer determines that the single stream ESG transport mode is used, the FLO adaptation layer may specify the FLO address for the ESG session in the FLO network address (e.g., a flow ID) in the corresponding ESGAccessDescriptor at block 1714. Then at block 1716, the FLO adaptation layer may add a FLO network address (e.g., a flow ID) field to each media description in each inline or out-of-band SDP file referenced by the acquisition fragment to describe the FLO address for each media component. Thereafter, the adapted service layer data may be broadcasted at block 1724.

Returning to decision block 1704, if the service content is not DVB-IPDC service content, the service content is OMA BCAST service content. If the service content is OMA BCAST service content, the FLO adaptation layer may add a FLO network address (e.g., a flow ID) field to each instance of the transport element in each SGDD to describe the FLO address for each SG session at block 1720. Further, at block 1722, the FLO adaptation layer may add a FLO network address (e.g., a flow ID) field to each media description in each inline or out-of-band SDP file referenced by the acquisition fragment to describe the FLO address for each media component. Thereafter, the adapted service layer data may be broadcasted at block 1724.

Figure 18A:
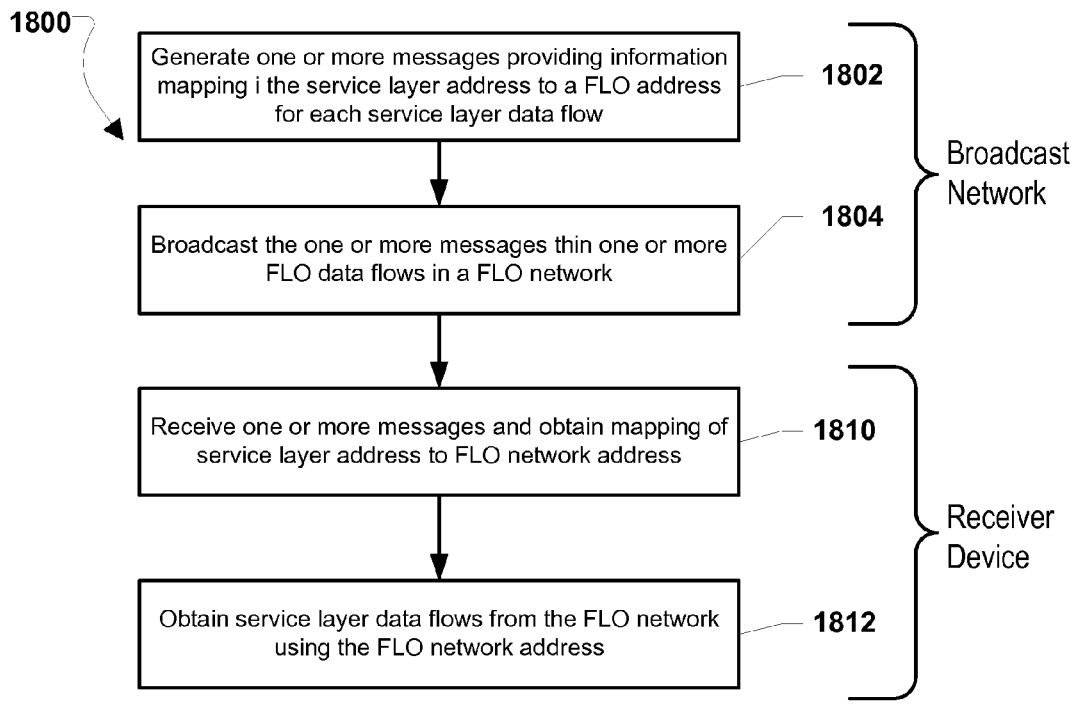
FIGS. 18A and 18B are process flow diagrams illustrating methods of service layer address to mobile broadcast address mapping.
Figure 18B:
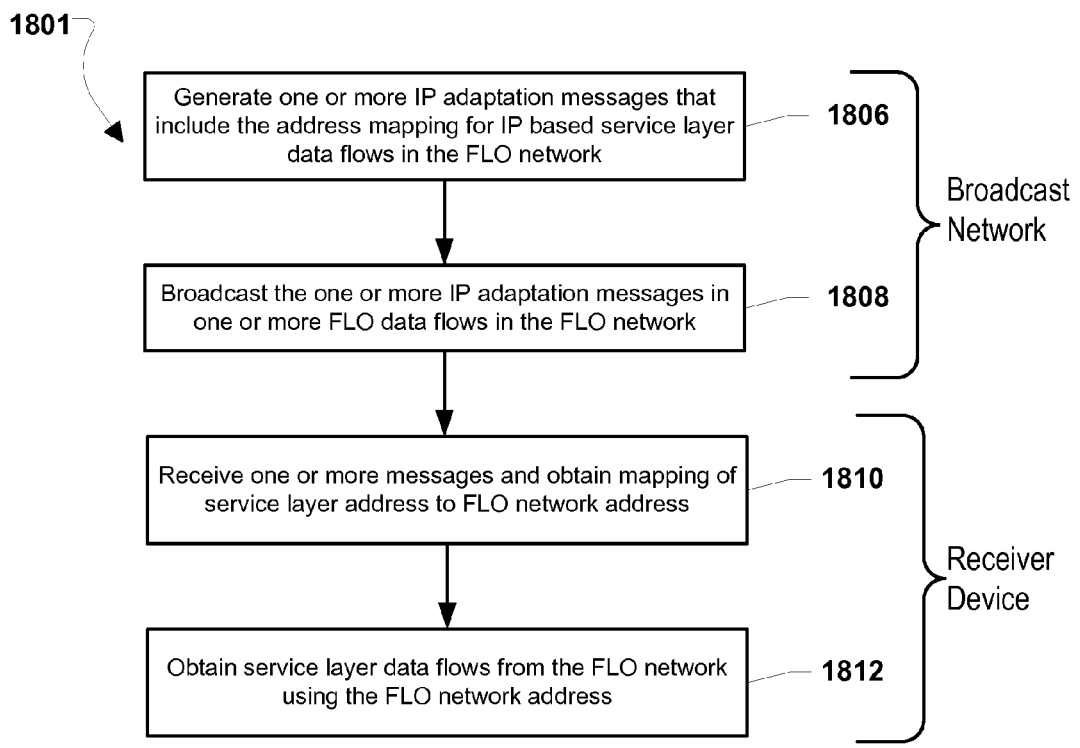

FIG. 18 illustrates a third method by which a receiving device can discover the, service layer address to FLO address mapping, generally designated 1800. In this method, the FLO adaptation layer may provide the mapping information between the service layer address and FLO address for each service layer data flow in one or more messages. At block 1802, the FLO adaptation layer may generate one or more messages that provide the mapping between the service layer address and the FLO network address for the service layer data flows carried in the FLO network in one or more FLO data flows in a FLO network. At block 1804, the generated one or more messages are broadcast via the FLO network in one or more FLO data flows. At block 1810, a receiving device FLO adaptation layer receives the one or more messages and obtains the mapping of service layer address to FLO network address. At block 1812, the FLO adaptation layer in the receiving device obtains the service layer data flows from the FLO network using the FLO network address. In this method, the FLO adaptation layer may provide one or more IP adaptation messages that include the address mapping for IP based service layer data flows in the FLO network. Alternatively, the FLO adaptation layer may broadcast one or more IP adaptation messages in one or more FLO data flows in the FLO network.

As a further alternative, the binary definition of the IP adaptation message may include a service platform ID, an instance version, a number of the total messages, a current message number, an IP version, and a number of entries. The service platform ID may provide an ID of the service platform to which the data flows belongs. The instance version may provide a version of the IP adaptation message. The number of the total messages may include a total number of the IP adaptation messages in the service platform. Also, the current message number may provide a number of the current IP adaptation message. The IP version may include the IP version of the service layer IP data flow, e.g., IPv4 or IPv6. The number of entries may include a number of service layer data flows described in the current IP adaptation message. For each data flow, the following parameters may be specified in the message: IP address; port number; and network address (e.g., a flow ID). The IP address may provide the IP address of the service layer data flow. The port number may provide a transport layer, e.g., UDP, port number of the service layer data flow. The network address (e.g., a flow ID) may provide an ID of the FLO flow carrying the service layer data flow in the FLO network. Table 1, below, provides a definition of the IP adaptation message.

TABLE 1

Definition of the IP Adaptation Message

| Field Name | Field Type |
| --- | --- |
| service platform ID | 24 bits |
| IP adaptation function instance | 16 bits |
| Number of total messages | 8 bits |
| Current message number | 8 bits |
| IP version | 1 bit |
| Reserved | 3 bits |
| Number of entries | 12 bits |
| for each entry | |
| IP address | 128 bits or 32 bits |
| Port | 16 bits |
| Flow ID | 20 bits |
| Padding | 0 or 4 bits |

The FLO data flows that carry the mapping information between the service layer address and FLO address for each service layer data flow may be carried in well-known FLO network addresses (e.g., a flow IDs). Alternatively, the network addresses (e.g., a flow IDs) of the FLO data flows that carry the mapping information between the service layer address and FLO address for each service layer data flow may be announced in a message. In a further alternative, the IP adaptation message may be announced in the directory message as an IP adaptation function with the following fields:
Function type: 0
Network address (e.g., a flow ID): ID of the flow carrying the IP adaptation message
Instance Version: version of the IP adaptation message.

The foregoing descriptions describe aspects of (1) adapting service content for transportation over a mobile broadcast network such as a FLO network, (2) adapting service guide and bootstrapping information to enable service discovery, and (3) address mapping from the service layer to the FLO network. Each of these three aspects may be combined in different ways to address different implementations or requirements. To illustrate how the different aspect may be combined, the following discussion with reference to FIGS. 19-25 describes three implementation examples.

Figure 19:
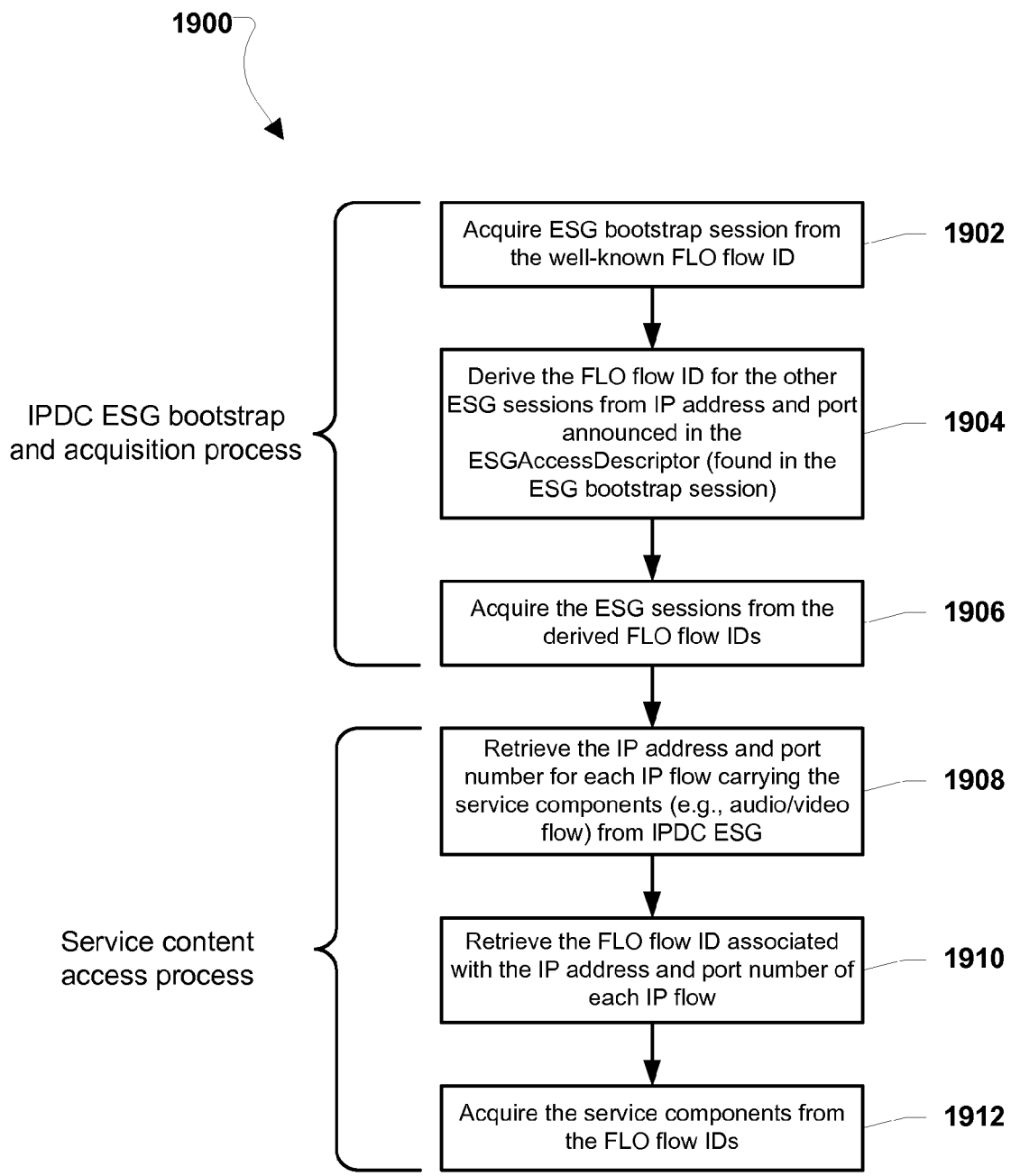
FIG. 19 is a process flow diagram illustrating a method of service discovery and content access.
Figure 20:
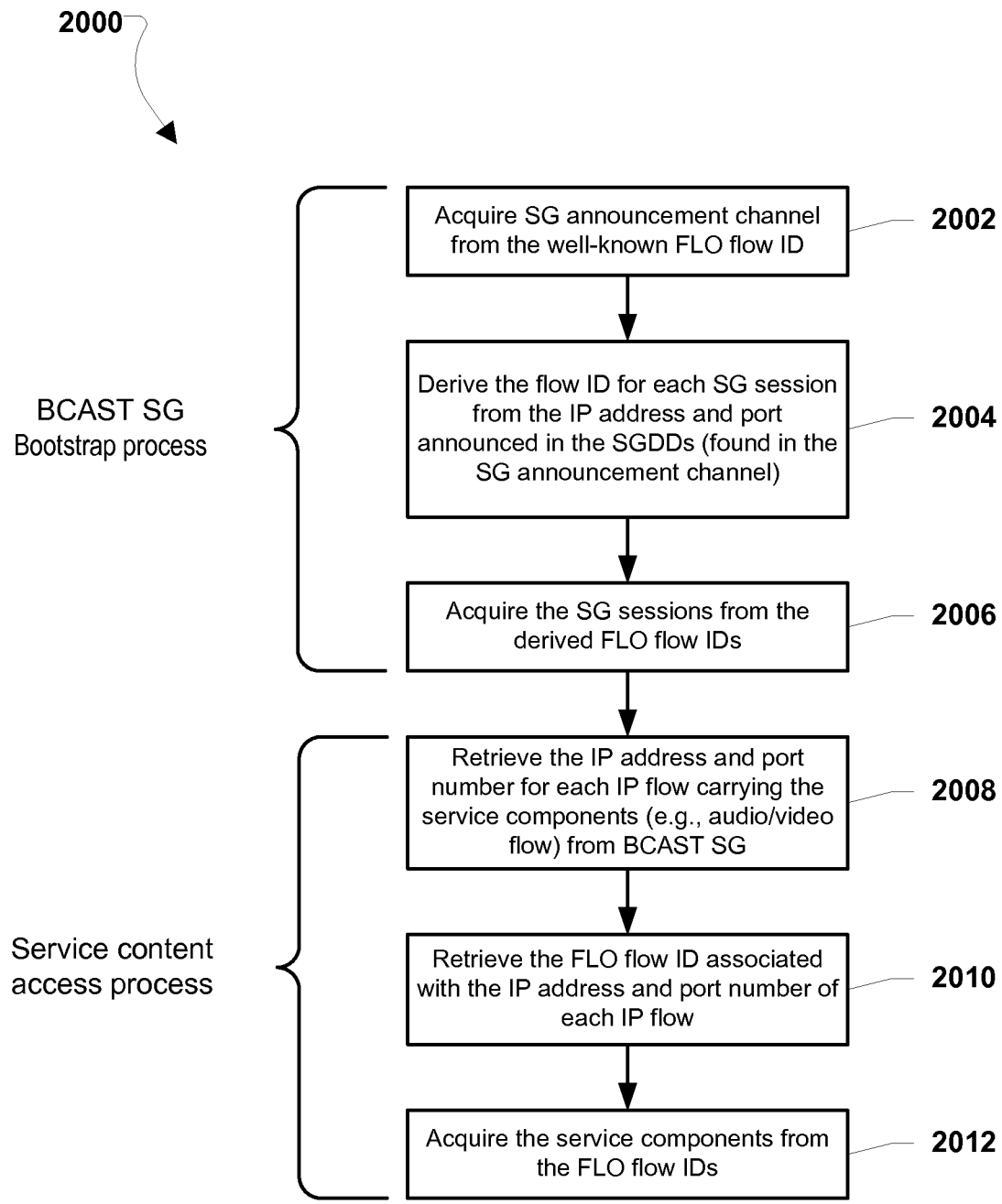
FIG. 20 is a process flow diagram illustrating a method of service discovery and content access.

In a first example illustrated in FIGS. 19 and 20, a simple FLO adaptation is provided. Specifically, in this example the FLO adaptation layer transports all data flows of a broadcast service layer over the IP layer delivered as MediaFLO IPDS (as described above with reference to FIG. 9), service bootstrap information is sent on one or more well-known FLO network addresses (e.g., a flow IDs) (as described above with reference to FIG. 11), and the FLO network head end system and the receiving devices locally perform a reproducible mapping function between the broadcast service layer address and the FLO address for each service layer data flow (as described above with reference to FIG. 16). FIG. 19 illustrates method steps that may be implemented when the service content is DVB-IPDC, while FIG. 20 illustrates method steps that may be implemented when the service content is OMA BCAST. This example introduces the minimum number of changes necessary to existing FLO at work and FLO enabled receiver devices.

Referring to FIG. 19, in method 1900, an adaptation layer implemented within a processor of a receiving device may discover and acquire the IPDC ESG bootstrap information by implementing the processes illustrated in blocks 1902-1906, and access the service content by implementing the processes illustrated in blocks 1908-1912. Specifically, at block 1902, the adaptation layer implemented within a processor of a receiving device may acquire an ESG bootstrap session from the well-known FLO network address (e.g., a flow ID). At block 1904, the adaptation layer may derive the FLO network address (e.g., a flow ID) for the other ESG sessions from the IP address and port announced in the ESGAccessDescriptor, e.g., found in the ESG bootstrap session. In a particular aspect, the receiving device may perform this derivation using the method described above with reference to FIG. 16. At block 1906, the adaptation layer may acquire the ESG sessions from the derived FLO network address (e.g., a flow ID). To access the service content, at block 1908, the adaptation layer implemented within the receiving device may retrieve the IP address and port number for each IP flow carrying the service components, e.g., audio/video flow, from the IPDC ESG. Thereafter, at block 1910, the receiving device adaptation layer may retrieve the FLO network address (e.g., a flow ID) associated with the IP address and port number of each IP flow. In a particular aspect, the receiving device may perform this retrieval using a reproducible mapping method, e.g., the method described in conjunction with FIG. 16. At block 1912, the receiving device may acquire the service components from the FLO network addresses (e.g., a flow IDs). At this point, the receiving device can implement the received service content, such as storing received files into memory or displaying real-time content on the device display.

Referring to FIG. 20, in method 2000 an adaptation layer implemented within a processor of a receiving device may discover and acquire the OMA BCAST SG announcement and other bootstrap information by implementing the processes illustrated in blocks 2002-2006, and access the service content by implementing the processes illustrated in blocks 2008-2012. Specifically, at block 2002, the adaptation layer within a receiving device may acquire an SG announcement channel from the well-known FLO network address (e.g., a flow ID). At block 2004, the receiving device adaptation layer may derive the network address (e.g., a flow ID) for each SG session from the IP address and port announced in the SGDDs, e.g., found in the SG announcement channel. In a particular aspect, the receiving device may perform this derivation using the method described above in conjunction with FIG. 16. At block 2006, the receiving device adaptation layer may acquire the SG sessions from the derived FLO network addresses (e.g., a flow IDs). To access the service content, at block 2008, the receiving device adaptation layer may retrieve the IP address and port number for each IP flow carrying the service components, such as audio/video flow, from the BCAST SG. At block 2010, the receiving device adaptation layer may retrieve the FLO network address (e.g., a flow ID) that is associated with the IP address and a port number of each IP flow. In a particular aspect, the receiving device may perform this retrieval using a reproducible mapping method, e.g., the method described above in conjunction with FIG. 16. At block 2012, the receiving device adaptation layer may acquire the service components from the FLO network addresses (e.g., flow IDs).

Figure 21:
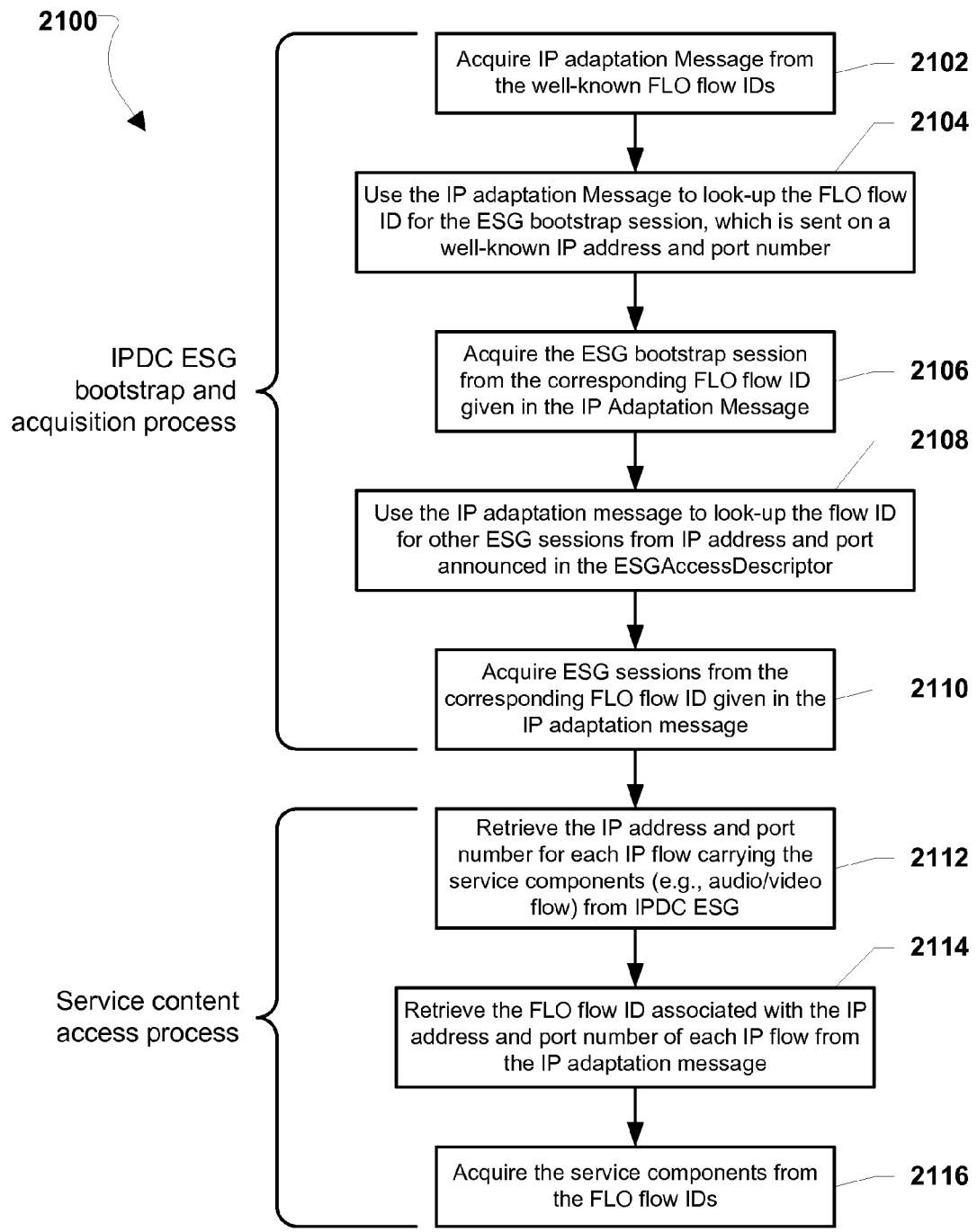
FIG. 21 is a process flow diagram illustrating a method of service discovery and content access.
Figure 22:
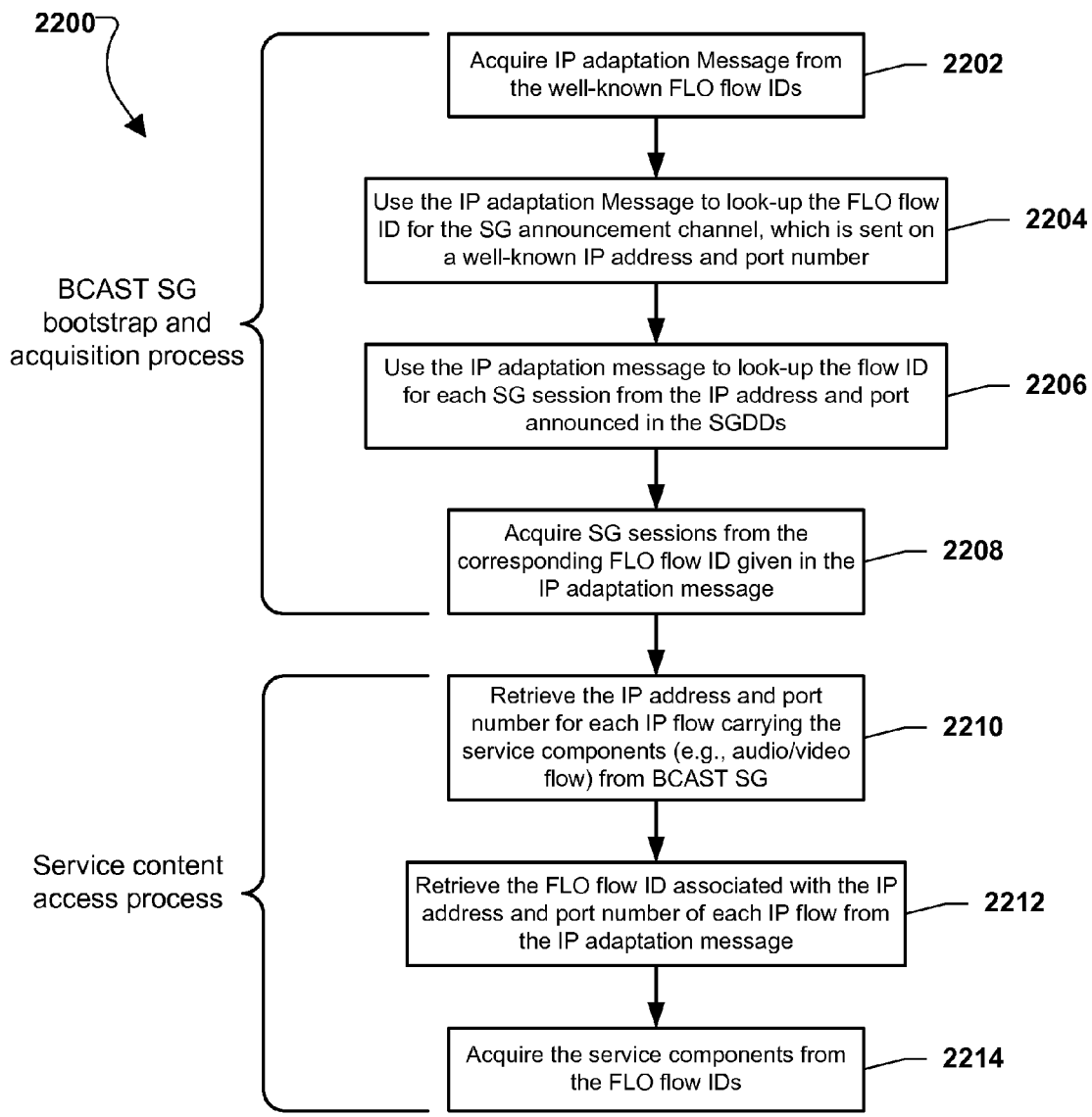
FIG. 22 is a process flow diagram illustrating a method of service discovery and content access.

In a second example illustrated in FIGS. 21 and 22, a simple FLO adaptation is provided with dynamic address mapping. Specifically, in this example the FLO adaptation layer transports all data flows of a broadcast service layer over at the IP layer delivered as MediaFLO IPDS (as described above with reference to FIG. 9), service bootstrap information is sent on one or more well-known service layer addresses (as described above with reference to FIG. 12), and the mapping information between the service layer address and FLO address for each service layer data flow is provided in one or more messages (as described above with reference to FIG. 18). FIG. 21 illustrates method steps that may be implemented when the service content is DVB-IPDC, while FIG. 22 illustrates method steps that may be implemented when the service content is OMA BCAST.

Referring to FIG. 21, in method 2100 an adaptation layer implemented within a processor of a receiving device may discover and acquire the IPDC ESG bootstrap information by implementing the processes illustrated in blocks 2102-2110, and access the service content by implementing the processes illustrated in blocks 2112-2116. Specifically, at block 2102, a receiving device adaptation layer may acquire an IP adaptation message from the well-known FLO network address (e.g., a flow ID). At block 2104, the receiving device adaptation layer may use the IP adaptation message to look-up the FLO network address (e.g., a flow ID) for the ESG bootstrap session, which is sent on a well-known IP address and port number. At block 2106, the receiving device adaptation layer may acquire the ESG bootstrap session from the corresponding FLO network address (e.g., a flow ID) given in the IP Adaptation Message. At block 2108, the receiving device adaptation layer may use the IP adaptation message to look-up the network address (e.g., a flow ID) for other ESG sessions from IP address and port announced in the ESGAccessDescriptor. At block 2110, the receiving device may acquire ESG sessions from the corresponding FLO network address (e.g., a flow ID) given in the IP adaptation message. To access the service content, at block 2112, the receiving device adaptation layer may retrieve the IP address and port number for each IP flow carrying the service components, e.g., audio/video flow, from the IPDC ESG. At block 2114, the receiving device adaptation layer may retrieve the FLO network address (e.g., a flow ID) associated with the IP address and port number of each IP flow from the IP adaptation message. At block 2116, the receiving device adaptation layer may acquire the service components from the FLO network address (e.g., a flow ID).

Referring to FIG. 22, in method 2200, an adaptation layer implemented within a processor of a receiving device may discover and acquire the OMA BCAST SG announcement and other bootstrap information by implementing the processes illustrated in blocks 2202-2208, and access the service content by implementing the processes illustrated in blocks 2210-2214. Specifically, at block 2202, a receiving device adaptation layer may acquire an IP adaptation Message from one or more well-known FLO network address (e.g., a flow ID). At block 2204, the receiving device adaptation layer may use the IP adaptation Message to look-up the FLO network address (e.g., a flow ID) for the SG announcement channel, which is sent on a well-known IP address and port number. At block 2206, the receiving device adaptation layer may use the IP adaptation message to look-up the network address (e.g., a flow ID) for each SG session from the IP address and port announced in the SGDDs. At block 2208, the receiving device adaptation layer may acquire one or more SG sessions from the corresponding FLO network address (e.g., a flow ID) given in the IP adaptation message. To access the service content, at block 2210, the receiving device adaptation layer may retrieve the IP address and port number for each IP flow carrying the service components, e.g., audio/video flow, from the BCAST SG. At block 2212, the receiving device adaptation layer may retrieve the FLO network address (e.g., a flow ID) associated with the IP address and port number of each IP flow from the IP adaptation message. At block 2214, the receiving device adaptation layer may then acquire the service components from the FLO network address (e.g., a flow ID).

Figure 23:
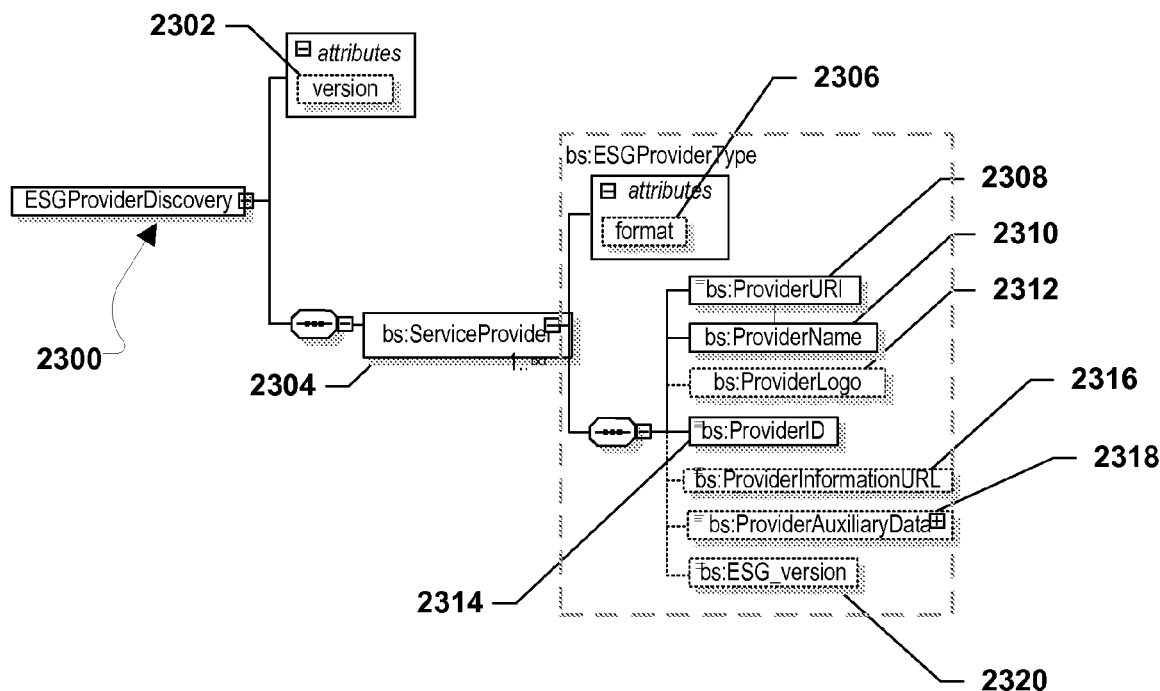
FIG. 23 is an XML schema diagram of an ESGProvider-Discovery descriptor.
Figure 24:
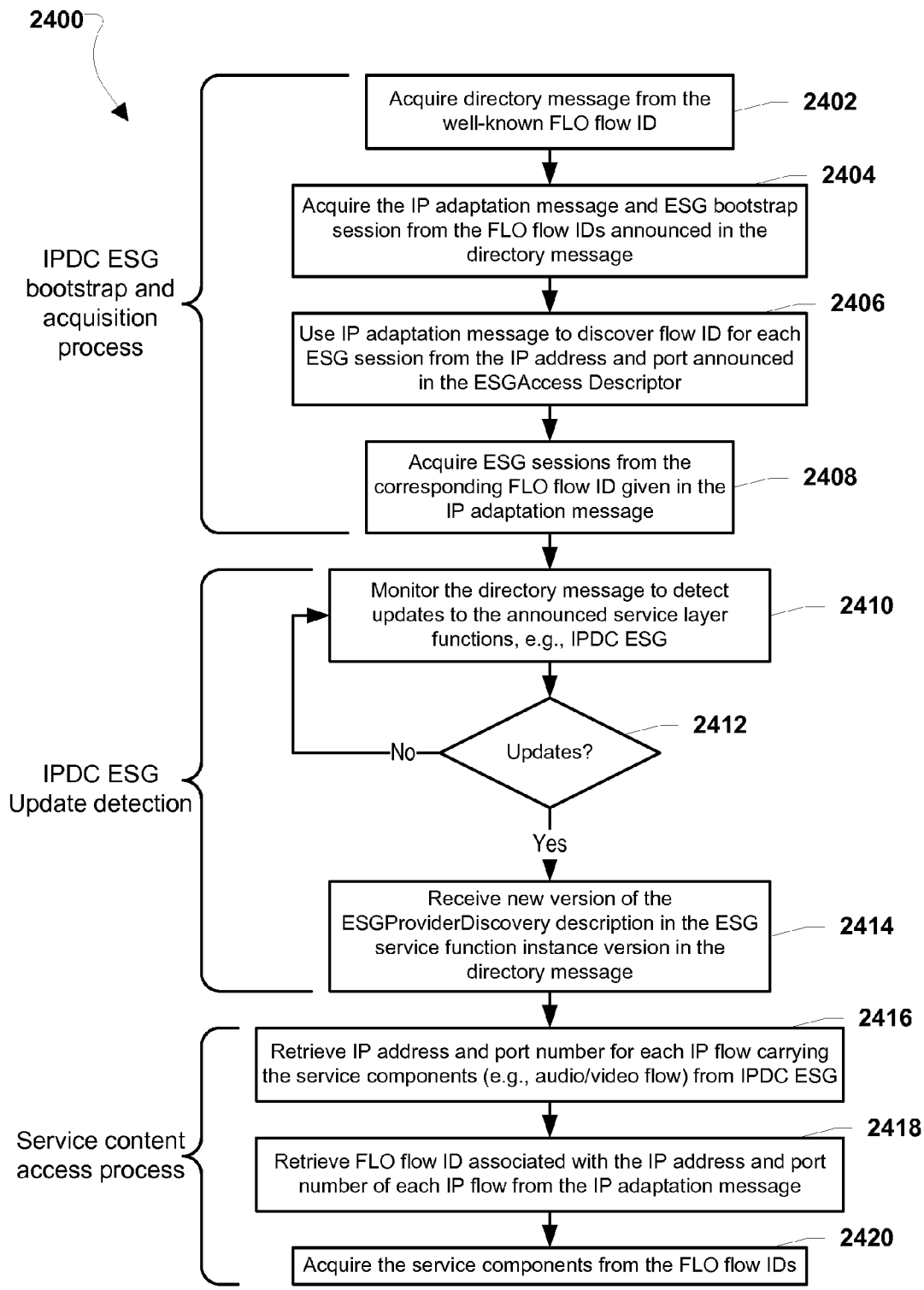
FIG. 24 is a process flow diagram illustrating a method of service discovery and content access.
Figure 25:
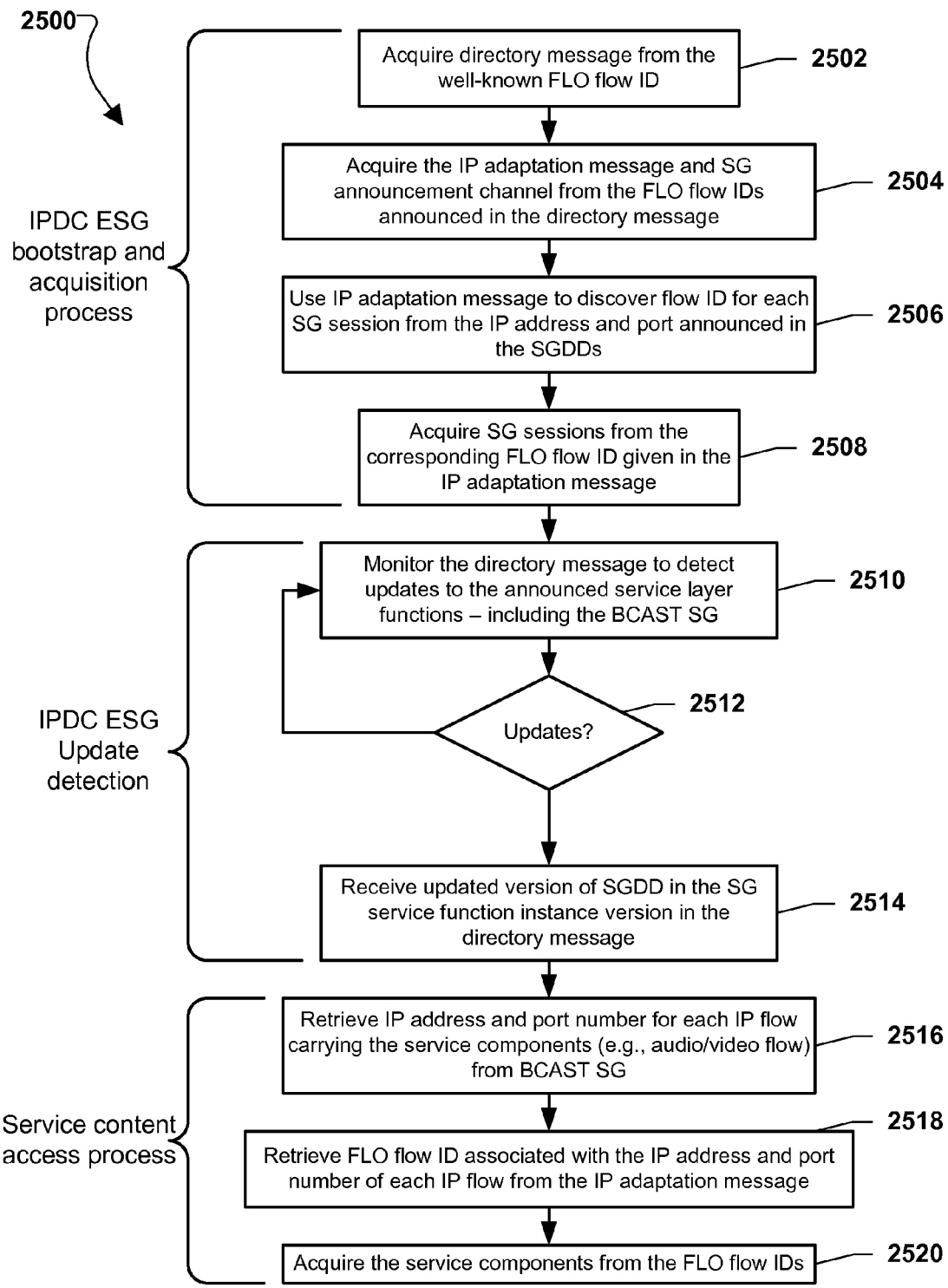
FIG. 25 is a process flow diagram illustrating a method of service discovery and content access.

In a third example illustrated in FIGS. 23-25, a generic FLO adaptation is provided with dynamic address mapping. Specifically, in this example the FLO adaptation layer transports all data flows of a broadcast service layer over at the IP layer delivered as MediaFLO IPDS (as described above with reference to FIG. 9), a service platform concept is defined in the FLO network to identify a service layer instance carried over a FLO network using a directory message to announce all be service layer functions for each service platform in a FLO network (as described above with reference to FIGS. 13-15), and the mapping information between the service layer address and FLO address for each service layer data flow is provided in one or more messages (as described above with reference to FIG. 18). FIG. 23 illustrates an XML schema for a directory message suitable for this example. FIG. 24 illustrates method steps that may be implemented when the service content is DVB-IPDC, while FIG. 25 illustrates method steps that may be implemented when the service content is OMA BCAST.

In this third example, service discovery in the FLO network may be achieved by using two messages: a directory message and an IP adaptation message. As described herein, the directory message can be an XML message that lists all the service layer functions for each service platform in the system, an example of which is illustrated in FIG. 23. The directory message may be carried on a well-known network address (e.g., a flow ID) in each multiplex in the FLO network. The IP adaptation message, described herein, may be a binary message that provides mapping from an IP address and a port number to the FLO network address (e.g., a flow ID) for all of the service layer data flows carried in the FLO network. This example provides a generic FLO adaptation to any service layers over the FLO network and provides efficient service update monitoring.

FIG. 23 illustrates an ESGProviderDiscovery descriptor, designated 2300, that may be used in a DVB-IPDC ESG according to this third example. The example ESGProviderDiscovery descriptor 2300 includes a version field 2302 and a service provider element 2304. The version field 2302 can indicate the version of the entire ESGProviderDiscovery descriptor 2300. The version field 2302 may be in sync with the instance version field for the ESG function announced in the directory message, described herein. The service provider element 2304 may include a format field 2306, a provider URI field 2308, a provider name field 2310, a provider logo field 2312, a provider ID field 2314, a provider information universal resource locator ("URL") field 2316, a private auxiliary data field 2318, and an ESG version field 2320.

Also in this example the provider URI field 2308 may indicate a uniform resource identifier associated with the provider. The provider name field 2310 may indicate the name of the provider of the service content. Further, the provider logo field 2312 may indicate, or otherwise provide, a logo associated with the provider. The provider ID field 2314 may indicate an ID associated with the provider. The provider information URL field 2316 may provide, or otherwise indicate, a URL associated with the provider where a user may locate more information from the provider regarding the service content. The private auxiliary data field 2318 may provide private auxiliary data associated with the provider. Additionally, the ESG version field 2320 may indicate the version of the ESG from the ESG provider.

Referring to FIG. 24, in method 2400, an adaptation layer implemented within a processor of a receiving device may discover and acquire the IPDC ESG bootstrap information by implementing the processes illustrated in blocks 2402-2408, detect an IPDC ESG update by implementing the processes illustrated in blocks 2410-2414, and access the service content by implementing the processes illustrated in blocks 2414-2420. Specifically, at block 2402, a receiving device adaptation layer may acquire a directory message from the well-known FLO network address (e.g., a flow ID). At block 2404, the receiving device adaptation layer may acquire an IP adaptation message and an ESG bootstrap session from the FLO network address (e.g., a flow ID) announced in the directory message. At block 2406, the receiving device adaptation layer may use the IP adaptation message to discover the network address (e.g., a flow ID) for each ESG session from the IP address and port announced in the ESGAccess Descriptor. At block 2408, the receiving device adaptation layer may acquire one or more ESG sessions from the corresponding FLO network address (e.g., a flow ID) given in the IP adaptation message.

To detect IPDC ESG updates, at block 2410, the receiving device adaptation layer may monitor the directory message to detect updates to the announced service layer functions, e.g., IPDC ESG. At decision block 2412, the receiving device adaptation layer may determine if any updates are available. If not, the method may return to block 2410 and continue monitoring the director message. If updates are available (i.e., decision block 2412="Yes"), the receiving device adaptation layer may receive a new version of the ESGProviderDiscovery description in the ESG service function instance version in the directory message at block 2414.

To access service content, at block 2416, the receiving device adaptation layer may retrieve an IP address and port number for each IP flow carrying the service components, e.g., audio/video flow, from the IPDC ESG. At block 2418, the receiving device adaptation layer may retrieve a FLO network address (e.g., a flow ID) associated with the IP address and port number of each IP flow from the IP adaptation message. Further, at block 2420, the receiving device adaptation layer may acquire the service components from the FLO network address (e.g., a flow ID).

In a particular aspect, if a fragment index is used, the receiving device adaptation layer can check the index in the ESG announcement carousel for updates to the ESG fragments. If a fragment index is not used, the receiving device may acquire each ESG session to check for updates to the ESG fragments.

Referring to FIG. 25, in method 2500, an adaptation layer implemented within a processor of a receiving device may discover and acquire the OMA BCAST SG announcement and other bootstrap information by implementing the processes illustrated in blocks 2502-2508, detect updates to the BCAST SG by implementing the processes illustrated in blocks 2510-2514, and access the service content by implementing the processes illustrated in blocks 2516-2520. Specifically, at block 2502, a receiving device adaptation layer may acquire a directory message from the well-known FLO network address (e.g., a flow ID). At block 2504, the receiving device adaptation layer may acquire an IP adaptation message and an SG announcement channel from the FLO network address (e.g., a flow ID) announced in the directory message. At block 2506, the receiving device adaptation layer may use the IP adaptation message to discover a network address (e.g., a flow ID) for each SG session from the IP address and port announced in the SGDDs. At block 2508, the receiving device adaptation layer may acquire one or more SG sessions from the corresponding FLO network address (e.g., a flow ID) given in the IP adaptation message.

To detect updates to the BCAST SG, at block 2510, the receiving device adaptation layer may monitor the directory message in order to detect updates to the announced service layer functions—including the BCAST SG. At decision block 2512, the receiving device adaptation layer may determine whether any updates are available. If not, the method may return to block 2510 and continue monitoring the directory message. When updates are available (i.e., decision block 2512="Yes"), the receiving device adaptation layer may receive an updated version of SGDD in the SG service function instance version in the directory message at block 2514.

To access service content, at block 2516, the receiving device adaptation layer may retrieve an IP address and a port number for each IP flow carrying the service components, e.g., audio/video flow, from the BCAST SG. At block 2518, the receiving device adaptation layer may retrieve a FLO network address (e.g., a flow ID) associated with the IP address and a port number of each IP flow from the IP adaptation message. Then at block 2520, the receiving device adaptation layer may acquire the service components from the FLO network address (e.g., a flow ID).

With the configurations described herein, the system and methods herein may allow the co-existence of multiple service layers from different service providers over a FLO network. It should be appreciated that a service platform may span over multiple multiplexes. Further, a multiplex may carry any subset of the services in a service platform and a multiplex may carry services from multiple service platforms. Moreover, it is to be understood that a service function of a service platform may have multiple instances in the system, e.g., different ESG instances in different multiplexes. A multiplex may not carry more than one instance per service function per service platform. It is to be understood that a device may only need to access a directory message for service discovery and updates. Moreover, the directory message may be carried on a well-known network address (e.g., a flow ID) in each multiplex.

Using the directory message a receiving device adaptation layer can find the service platform associated with the receiving device and the service functions available in the service platform. For each service function, the receiving device adaptation layer can determine the service instance, ID, and version, available in the current multiplex. Further, the receiving device adaptation layer can access the service instance via the announced network address (e.g., a flow ID) in the service function element of the directory message. The receiving device adaptation layer can monitor the directory flow periodically. If the current multiplex ID and the version of the associated service platform remain the same, no action is required. Otherwise, if a new service function is announced in the service platform, the receiving device adaptation layer may acquire the service instance available in the current multiplex. For each existing service function, if the service instance available in the current multiplex changes, either ID or version, the receiving device adaptation layer may re-acquire the service function via the announced network address (e.g., a flow ID). Otherwise, no action may be necessary.

The systems and methods herein also provide an IP adaptation function that provides dynamic mapping from IP address and port to the network address (e.g., a flow ID). Further, the IP adaptation function may be used to support IP based service functions over the FLO network. An announcement of the IP adaptation function in the directory message can include a function type, a network address (e.g., a flow ID), and an instance version. The network address (e.g., a flow ID) may be the ID of the flow carrying the IP adaptation message. Moreover, the instance version may be the version of the IP adaptation message. If the IP adaptation message is updated, the server can update the instance version of the IP adaptation service function in the directory message.

In order to acquire the ESG using IPDC over the FLO network, a device may obtain directory flow from a well-known network address (e.g., a flow ID) and determine the network address (e.g., a flow ID) of an IP adaptation message ("IAM") and an ESG bootstrap session. The receiving device adaptation layer can obtain the IAM and ESG bootstrap session in parallel. Further, the receiving device adaptation layer may acquire the ESG sessions based on information in the ESG bootstrap descriptors and IAM. In order to acquire content from an IP address or port using IPDC over the FLO network, a receiving device adaptation layer can obtain a network address (e.g., a flow ID) associated with the IP address or port from IAM. Further, the receiving device adaptation layer can obtain the content from the network address (e.g., a flow ID).

The systems and methods described herein may support multiple concurrent service platforms over the FLO network. Further, the systems and methods are extensible to support other service layers. Also, the systems and methods provide uniform and efficient service discovery and update monitoring for any service layer function. Also, the systems and methods herein provide dynamic address mapping between IP addresses, or ports, and network address (e.g., a flow ID). Any IP address and port number may be supported and no hard-coded static mapping logic on a receiving device is required.

The aspects described above may be implemented on any of a variety of portable computing devices, such as, for example, cellular telephones, personal data assistants (PDA) with mobile TV receiver, mobile web access devices, and other processor-equipped devices that may be developed in the future configured to receive mobile broadcast transmissions. Typically, such portable computing devices will have in common the components illustrated in FIG. 26. For example, the portable computing devices 2600 may include a processor 2601 coupled to internal memory 2602 and to a display 2603. Additionally, the portable computing device 2600 may have an antenna 2604 for sending and receiving electromagnetic radiation that is connected to a wireless data link and/or cellular telephone transceiver 2605 coupled to the processor 2601. Portable computing devices 2600 also typically include a key pad 2606 or miniature keyboard and menu selection buttons or rocker switches 2607 for receiving user inputs, as well as a speaker 2609 for generating an audio output.

The mobile device 2600 may further include a mobile broadcast receiver 2608 coupled to the antenna and to the processor 2601. The mobile broadcast receiver 2608 is configured to receive mobile broadcasts and provide the received information to the processor 2601 in a format that enables the processor 2601 to display the received programs on the display 2603 and speaker 2609. The mobile broadcast receiver 2608 may include circuitry for decrypting encrypted broadcast content, or may provide the encrypted broadcast content to the processor 2601 for decryption.

The processor 2601 may be any programmable microprocessor, microcomputer or multiple processor chip or chips that can be configured by software instructions (applications) to perform a variety of functions, including the functions described above. In some portable computing device 2600, multiple processors 2601 may be provided, such as one processor dedicated to managing voice and data communications, and one processor dedicated to running other applications. Typically, software applications may be stored in the internal memory 2602 before they are accessed and loaded into the processor 2601. In some mobile devices 2600, the processor 2601 may include internal memory sufficient to store the application software instructions. For the purposes of this description, the term memory refers to all memory accessible by the processor 2601, including internal memory 2602 and memory within the processor 2601 itself. In many portable computing devices 2600, the memory 182 may be a volatile or nonvolatile memory, such as flash memory, or a mixture of both.

Figure 27:
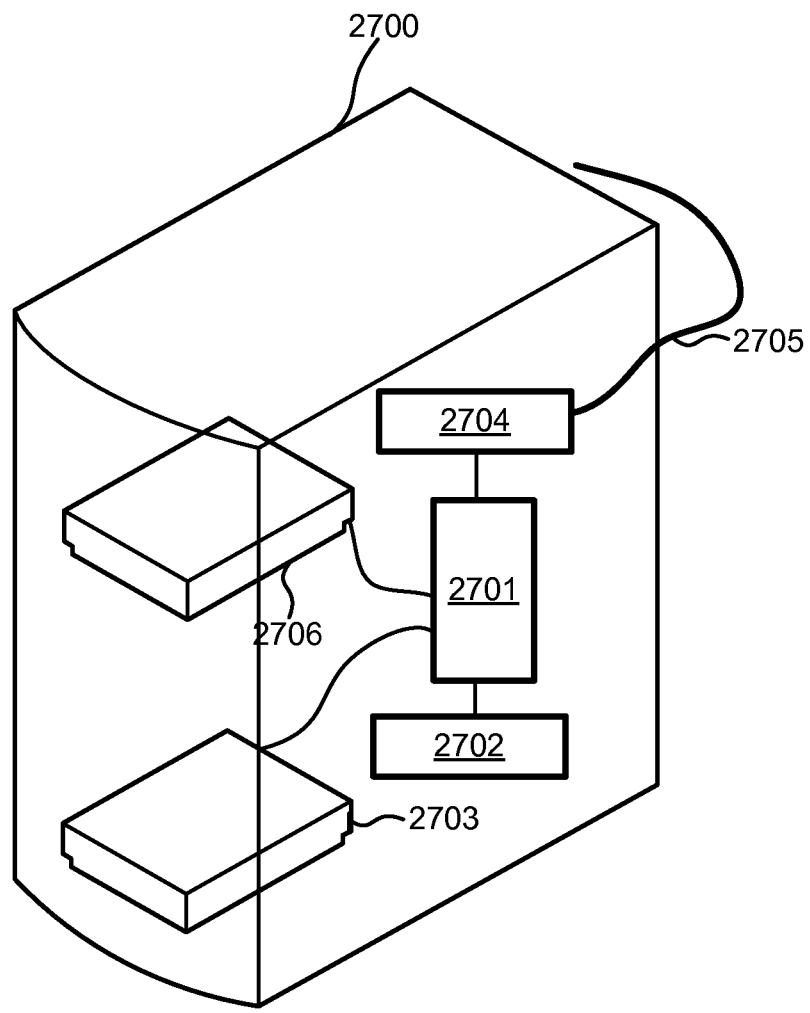
FIG. 27 is a component block diagram of a server.

A number of the aspects described above may also be implemented with any of a variety of remote server devices, such as the server 2700 illustrated in FIG. 27. Such a server 2700 typically includes a processor 2701 coupled to volatile memory 2702 and a large capacity nonvolatile memory, such as a disk drive 2703. The server 210 may also include a floppy disc drive and/or a compact disc (CD) drive 2706 coupled to the processor 2701. The server 210 may also include a number of connector ports c2704 coupled to the processor 2701 for establishing data connections with network circuits 2705.

The foregoing method descriptions and the process flow diagrams are provided merely as illustrative examples and are not intended to require or imply that the steps discussed therein must be performed in the order presented. As will be appreciated by one of skill in the art the order of steps described herein may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on as one or more software instructions or code on a non-transitory computer-readable medium. The steps of a method or algorithm disclosed herein may be embodied in a processor-executable software module which may reside on a non-transitory computer-readable medium. Non-transitory computer readable media includes both computer storage media and communication media including any medium that facilitates transfer of a computer program from one place to another. A non-transitory storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description is provided to enable any person skilled in the art to make or use aspects of the present invention. Various modifications to these will be readily apparent to those skilled in the art, and the generic principles defined herein may be adapted and extended without departing from the spirit or scope of the invention. Thus, the present invention is not intended to be limited by the methods and apparatus discussed herein but is to be accorded the widest scope consistent with the following claims and the principles and novel features disclosed herein.

What is claimed is:

1. A method for carrying broadcast services over a first wireless broadcast network that carries a first type of service content, the method comprising:
   performing a service transport adaptation on a second type of service content different from the first type of service content such that a content portion and a service guide portion of the second type of service content are transmitted using different protocols, wherein:
      a portion of data flows associated with the second type of service content but excluding service guide information is transported over an Internet protocol UP) layer for delivery as IP datacast services ("IPDS"); and
      service guide information associated with the second type of service content is transported as file delivery services over a file delivery layer;
   performing a service bootstrapping adaptation on the second type of service content;
   performing a service address to network address adaptation for the second type of service content; and
   broadcasting the adapted second type of service content over the first wireless broadcast network.

2. The method of claim 1, wherein performing a service bootstrapping adaptation on the second type of service content comprises:
   sending service bootstrap information associated with the second type of service content over a well known network address associated with the first wireless broadcast network.

3. The method of claim 2, wherein performing a service address to network address adaptation on the second type of service content further comprises:
   providing direct access to a data flow in the first wireless broadcast network in order to allow a receiving device to discover the second type of service content available in the first wireless broadcast network.

4. The method of claim 1, wherein performing a service bootstrapping adaptation on the second type of service content comprises:
   sending service bootstrap information associated with the second type of service content over one or more well-known service layer addresses in the first wireless broadcast network.

5. The method of claim 4, wherein the well-known service layer addresses are a well-known Internet protocol (IP) address and port number.

6. The method of claim 1, wherein performing a service bootstrapping adaptation on the second type of service content comprises:
   defining a service platform concept in the first wireless broadcast network to identify a service layer instance carried over the first wireless broadcast network.

7. The method of claim 6, wherein performing a service bootstrapping adaptation on the second type of service content further comprises transmitting a directory message to announce all service layer functions for each service platform in the first wireless broadcast network.

8. The method of claim 6, wherein performing a service bootstrapping adaptation on the second type of service content further comprises sending a Directory message in a well-known wireless broadcast network address, wherein the Directory message:
   announces the wireless broadcast network addresses and service layer addresses for the data flows in each service platform; and announces the wireless broadcast network addresses and service layer addresses for the data flow carrying the service bootstrap information for each service platform.

9. The method of claim 1, wherein performing a service address to network address adaptation on the second type of service content comprises:
performing a reproducible mapping function between a broadcast service layer address associated with a second wireless broadcast network and a network address associated with the first wireless broadcast network for each data flow associated with the second type of service content.

10. The method of claim 9, wherein performing a service address to network address adaptation on the second type of service content further comprises:
deriving a network address from an IP address and a port number of an IP-based broadcast service layer data flow.

11. The method of claim 1, wherein performing a service address to network address adaptation on the second type of service content comprises:
adding a network address of each service layer data flow to service layer information that describes service layer data flows.

12. The method of claim 11, wherein adding a network address of each service layer data flow to service layer information that describes service layer data flows comprises:
adding a wireless broadcast network address filed to each electronic service guide (ESG) descriptor to describe the wireless broadcast address for each ESG session when the second type of service content follows DVB-IPDC standards;
adding a wireless broadcast network address filed to each entry in a session partition declaration of an ESG initialization container to describe the wireless broadcast address of each ESG session when the second type of service content follows DVB-IPDC standards and multi-stream ESG transport mode is used;
adding a wireless broadcast network address filed to each media descriptor in each inline or out-of-band SDP file referenced by an acquisition fragment to describe the wireless broadcast address for each media component when the second type of service content follows DVB-IPDC standards;
adding a wireless broadcast network address filed to each instance of a transport element in each service guide delivery descriptor (SGDD) to describe the wireless broadcast address for each service guide (SG) session when the second type of service content follows OMA BCAST standards; and
adding a wireless broadcast network address filed to each media description in each inline or out-of-band SDP file referenced by an acquisition fragment to describe the wireless broadcast address of each media component when the second type of service content follows OMA BCAST standards.

13. The method of claim 1, wherein performing a service address to network address adaptation on the second type of service content comprises:
providing mapping information between a service layer address and a wireless broadcast address for each service layer data flow in one or more messages.

14. The method of claim 13, wherein the one or more messages providing mapping information between a service layer address and a wireless broadcast address for each service layer data flow are broadcasted in one or more wireless broadcast data flows in the first wireless broadcast network.

15. A server for broadcasting content over a first wireless broadcast network of a first type of service content, the server comprising:
a processor configured with executable instructions to perform operations comprising:
performing a service transport adaptation on a second type of service content different from the first type of service content such that a content portion and a service guide portion of the second type of service content are transmitted using different protocols, wherein:
a portion of data flows associated with the second type of service content but excluding service guide information is transported over an Internet protocol (IP) layer for delivery as datacast services ("IPDS"); and
service guide information associated with the second type of service content is transported as file delivery services over a file delivery layer;
performing a service bootstrapping adaptation on the second type of service content;
performing a service address to network address adaptation for the second type of service content; and
broadcasting the adapted second type of service content over the first wireless broadcast network.

16. The server of claim 15, wherein the processor is configured with executable instructions such that performing a service bootstrapping adaptation on the second type of service content comprises:
sending service bootstrap information associated with the second type of service content over a network address associated with the first wireless broadcast network.

17. The server of claim 16, wherein the processor is configured with executable instructions such that performing a service bootstrapping adaptation on the second type of service content comprises:
providing direct access to a data flow in the first wireless broadcast network in order to allow a receiving device to discover the second type of service content available in the first wireless broadcast network.

18. The server of claim 15, wherein the processor is configured with executable instructions such that performing a service bootstrapping adaptation on the second type of service content comprises:
sending service bootstrap information associated with the second type of service content over one or more well-known service layer addresses in the first wireless broadcast network.

19. The server of claim 18, wherein the well-known service layer addresses are a well-known Internet protocol (IP) address and port number.

20. The server of claim 15, wherein the processor is configured with executable instructions such that performing a service bootstrapping adaptation on the second type of service content comprises:
defining a service platform concept in the first wireless broadcast network to identify a service layer instance carried over the first wireless broadcast network.

21. The server of claim 20, wherein the processor is configured with executable instructions such that performing a service bootstrapping adaptation on the second type of service content further comprises transmitting a directory message to announce all service layer functions for each service platform in the first wireless broadcast network.

22. The server of claim 20, wherein the processor is configured with executable instructions such that performing a service bootstrapping adaptation on the second type of service content further comprises sending a Directory message in a well-known wireless broadcast network address, wherein the Directory message:
  announces the wireless broadcast network addresses and service layer addresses for the data flows in each service platform; and
  announces the wireless broadcast network addresses and service layer addresses for the data flow carrying the service bootstrap information for each service platform.

23. The server of claim 15, wherein the processor is configured with executable instructions such that performing a service address to network address adaptation for the second type of service content comprises:
  performing a reproducible mapping function between a broadcast service layer address associated with a second wireless broadcast network and a network address associated with the first wireless broadcast network for each data flow associated with the second type of service content.

24. The server of claim 23, wherein the processor is configured with executable instructions such that performing a service address to network address adaptation for the second type of service content comprises:
  deriving a network address from an IP address and a port number of an IP-based broadcast service layer data flow.

25. The server of claim 15, wherein the processor is configured with executable instructions such that performing a service address to network address adaptation for the second type of service content comprises:
  adding a wireless broadcast network address of each service layer data flow to service layer information that describes service layer data flows.

26. The server of claim 25, wherein the processor is configured with executable instructions such that adding a wireless broadcast network address of each service layer data flow to service layer information that describes service layer data flows comprises:
  adding a wireless broadcast network address filed to each electronic service guide (ESG) descriptor to describe the wireless broadcast address for each ESG session when the second type of service content follows DVB-IPDC standards;
  adding a wireless broadcast network address filed to each entry in a session partition declaration of an ESG initialization container to describe the wireless broadcast address of each ESG session when the second type of service content follows DVB-IPDC standards and multi-stream ESG transport mode is used;
  adding a wireless broadcast network address filed to each media descriptor in each inline or out-of-band SDP file referenced by an acquisition fragment to describe the wireless broadcast address for each media component when the second type of service content follows DVB-IPDC standards;
  adding a wireless broadcast network address filed to each instance of a transport element in each service guide delivery descriptor (SGDD) to describe the wireless broadcast address for each service guide (SG) session when the second type of service content follows OMA BCAST standards; and
  adding a wireless broadcast network address filed to each media description in each inline or out-of-band SDP file referenced by an acquisition fragment to describe the wireless broadcast address of each media component when the second type of service content follows OMA BCAST standards.

27. The server of claim 15, wherein the processor is configured with executable instructions such that performing a service address to network address adaptation for the second type of service content comprises:
  providing mapping information between a service layer address and a wireless broadcast address for each service layer data flow in one or more messages.

28. The server of claim 27, wherein the processor is configured with executable instructions such that the one or more messages providing mapping information between a service layer address and a wireless broadcast address for each service layer data flow are broadcasted in one or more wireless broadcast data flows in the first wireless broadcast network.

29. A server for broadcasting content over a first wireless broadcast network of a first type of service content, the server comprising:
  means for performing a service transport adaptation on a second type of service content different from the first type of service content such that a content portion and a service guide portion of the second type of service content are transmitted using different protocols, wherein:
    a portion of data flows associated with the second type of service content but excluding service guide information is transported over an Internet protocol (IP) layer for delivery as IP datacast services ("IPDS"); and
    service guide information associated with the second type of service content is transported as file delivery services over a file delivery layer;
  means for performing a service bootstrapping adaptation on the second type of service content;
  means for performing a service address to network address adaptation for the second type of service content; and
  means for broadcasting the adapted second type of service content over the first wireless broadcast network.

30. The server of claim 29, wherein means for performing a service bootstrapping adaptation on the second type of service content comprises:
  means for sending service bootstrap information associated with the second type of service content over a network address associated with the first wireless broadcast network.

31. The server of claim 29, wherein means for performing a service bootstrapping adaptation on the second type of service content further comprises:
  means for providing direct access to a data flow in the first wireless broadcast network in order to allow a receiving device to discover the second type of service content available in the first wireless broadcast network.

32. The server of claim 29, wherein means for performing a service bootstrapping adaptation on the second type of service content comprises:
  means for sending service bootstrap information associated with the second type of service content over one or more well-known service layer addresses in the first wireless broadcast network.

33. The server of claim 32, wherein the well-known service layer addresses are a well-known Internet protocol (IP) address and port number.

34. The server of claim 29, wherein means for performing a service bootstrapping adaptation on the second type of service content comprises:
  means for defining a service platform concept in the first wireless broadcast network to identify a service layer instance carried over the first wireless broadcast network.

35. The server of claim 34, wherein means for performing a service bootstrapping adaptation on the second type of service content further comprises transmitting a directory message to announce all service layer functions for each service platform in the first wireless broadcast network.

36. The server of claim 34, wherein means for performing a service bootstrapping adaptation on the second type of service content further comprises means for sending a Directory message in a well-known first wireless broadcast network address, wherein the Directory message:
announces the first wireless broadcast network addresses and service layer addresses for the data flows in each service platform; and
announces the first wireless broadcast network addresses and service layer addresses for the data flow carrying the service bootstrap information for each service platform.

37. The server of claim 29, wherein means for performing a service address to network address adaptation for the second type of service content comprises:
means for performing a reproducible mapping function between a broadcast service layer address associated with a second wireless broadcast network and a network address associated with the first wireless broadcast network for each data flow associated with the second type of service content.

38. The server of claim 37, wherein means for performing a service address to network address adaptation for the second type of service content comprises:
means for deriving a network address from an IP address and a port number of an IP-based broadcast service layer data flow.

39. The server of claim 29, wherein means for performing a service address to network address adaptation comprises:
means for adding a wireless broadcast network address of each service layer data flow to service layer information that describes service layer data flows.

40. The server of claim 39, wherein means for adding a wireless broadcast network address of each service layer data flow to service layer information that describes service layer data flows comprises:
means for adding a wireless broadcast network address filed to each electronic service guide (ESG) descriptor to describe the wireless broadcast address for each ESG session when the second type of service content follows DVB-IPDC standards;
means for adding a wireless broadcast network address filed to each entry in a session partition declaration of an ESG initialization container to describe the wireless broadcast address of each ESG session when the second type of service content follows DVB-IPDC standards and multi-stream ESG transport mode is used;
means for adding a wireless broadcast network address filed to each media descriptor in each inline or out-of-band SDP file referenced by an acquisition fragment to describe the wireless broadcast address for each media component when the second type of service content follows DVB-IPDC standards;
means for adding a wireless broadcast network address filed to each instance of a transport element in each service guide delivery descriptor (SGDD) to describe the wireless broadcast address for each service guide (SG) session when the second type of service content follows OMA BCAST standards; and
means for adding a wireless broadcast network address filed to each media description in each inline or out-of-band SDP file referenced by an acquisition fragment to describe the wireless broadcast address of each media component when the second type of service content follows OMA BCAST standards.

41. The server of claim 29, wherein means for performing a service address to network address adaptation comprises:
means for providing mapping information between a service layer address and a wireless broadcast address for each service layer data flow in one or more messages.

42. The server of claim 41, further comprising means for broadcasting the one or more messages providing mapping information between a service layer address and a wireless broadcast address for each service layer data flow in one or more first wireless broadcast data flows in the first wireless broadcast network.

43. A non-transitory computer-readable medium having stored thereon software instructions configured to cause a processor to perform operations comprising:
performing a service transport adaptation on a second type of service content to enable transport of the second type of service content over a first wireless broadcast network of a first type of service content different from the second type of service content such that a content portion and a service guide portion of the second type of service content are transmitted using different protocols, wherein:
a portion of data flows associated with the second type of service content but excluding service guide information is transported over an Internet protocol UP) layer for delivery as IP datacast services ("IPDS"); and
service guide information associated with the second type of service content is transported as file delivery services over a file delivery layer;
performing a service bootstrapping adaptation on the second type of service content;
performing a service address to network address adaptation for the second type of service content; and
broadcasting the adapted second type of service content over the first wireless mobile broadcast network.

44. The non-transitory computer-readable medium of claim 43, wherein the stored software instructions are configured to cause a processor to perform operations such that performing a service transport adaptation on the second type of service content further comprises:
sending service bootstrap information associated with the second type of service content over a network address associated with the first wireless broadcast network.

45. The non-transitory computer-readable medium of claim 44, wherein the stored software instructions are configured to cause a processor to perform operations further comprising:
providing direct access to a data flow in the first wireless broadcast network in order to allow a receiving device to discover the second type of service content available in the first wireless broadcast network.

46. The non-transitory computer-readable medium of claim 43, wherein the stored software instructions are configured to cause a processor to perform operations such that performing a service bootstrapping adaptation on the second type of service content comprises:
sending service bootstrap information associated with the second type of service content over one or more well-known service layer addresses in the first wireless broadcast network.

47. The non-transitory computer-readable medium of claim 46, wherein the well-known service layer addresses are a well-known Internet protocol (IP) address and port number.

48. The non-transitory computer-readable medium of claim 43, wherein the stored software instructions are configured to cause a processor to perform operations such that performing a service bootstrapping adaptation on the second type of service content comprises:
defining a service platform concept in the first wireless broadcast network to identify a service layer instance carried over the first wireless broadcast network.

49. The non-transitory computer-readable medium of claim 48, wherein the stored software instructions are configured to cause a processor to perform operations such that performing a service bootstrapping adaptation on the second type of service content further comprises:
transmitting a directory message to announce all service layer functions for each service platform in the first wireless broadcast network.

50. The non-transitory computer-readable medium of claim 48, wherein the stored software instructions are configured to cause a processor to perform operations such that performing a service bootstrapping adaptation on the second type of service content further comprises:
sending a Directory message in a well-known wireless broadcast network address, wherein the Directory message:
announces the wireless broadcast network addresses and service layer addresses for the data flows in each service platform; and
announces the wireless broadcast network addresses and service layer addresses for the data flow carrying the service bootstrap information for each service platform.

51. The non-transitory computer-readable medium of claim 43, wherein the stored software instructions are configured to cause a processor to perform operations further comprising:
performing a reproducible mapping function between a broadcast service layer address associated with a second wireless mobile broadcast network and a network address associated with the first wireless broadcast network for each data flow associated with the second type of service content.

52. The non-transitory computer-readable medium of claim 51, wherein the stored software instructions are configured to cause a processor to perform operations further comprising:
deriving a network address from an IP address and a port number of an IP-based broadcast service layer data flow.

53. The non-transitory computer-readable medium of claim 43, wherein the stored software instructions are configured to cause a processor to perform operations such that performing a service address to network address adaptation on the second type of service content comprises:
adding a wireless broadcast network address of each service layer data flow to service layer information that describes service layer data flows.

54. The non-transitory computer-readable medium of claim 43, wherein the stored software instructions are configured to cause a processor to perform operations such that adding a wireless broadcast network address of each service layer data flow to service layer information that describes service layer data flows comprises:
adding a wireless broadcast network address filed to each electronic service guide (ESG) descriptor to describe the wireless broadcast address for each ESG session when the second type of service content follows DVB-IPDC standards;
adding a wireless broadcast network address filed to each entry in a session partition declaration of an ESG initialization container to describe the wireless broadcast address of each ESG session when the second type of service content follows DVB-IPDC standards and multi-stream ESG transport mode is used;
adding a wireless broadcast network address filed to each media descriptor in each inline or out-of-band SDP file referenced by an acquisition fragment to describe the wireless broadcast address for each media component when the second type of service content follows DVB-IPDC standards;
adding a wireless broadcast network address filed to each instance of a transport element in each service guide delivery descriptor (SGDD) to describe the wireless broadcast address for each service guide (SG) session when the second type of service content follows OMA BCAST standards; and
adding a wireless broadcast network address filed to each media description in each inline or out-of-band SDP file referenced by an acquisition fragment to describe the wireless broadcast address of each media component when the second type of service content follows OMA BCAST standards.

55. The non-transitory computer-readable medium of claim 43, wherein the stored software instructions are configured to cause a processor to perform operations such that performing a service address to network address adaptation on the second type of service content comprises:
providing mapping information between a service layer address and a wireless broadcast address for each service layer data flow in one or more messages.

56. The non-transitory computer-readable medium of claim 55, wherein the one or more messages providing mapping information between a service layer address and a wireless broadcast network address for each service layer data flow are broadcasted in one or more wireless broadcast data flows in the first wireless broadcast network.

57. A method of receiving, from a first wireless broadcast network, a service content, wherein the service content is adapted for transport over the first wireless broadcast network, service bootstrap information of the service content has been adapted for transport over the first wireless broadcast network, and a service address of the service content is mapped to a wireless broadcast network address, the method comprising:
discovering a wireless broadcast network address for each service layer data flow from its service layer address;
acquiring service bootstrap information for the service content from the discovered broadcast network address;
deriving a wireless broadcast network address for a service guide session from the service bootstrap information;
acquiring the service guide session from the derived wireless broadcast network address;
retrieving a service layer address for each service layer flow carrying one or more components of the service content from the acquired service guide session;
retrieving a wireless broadcast network address associated with the service layer address for each service layer flow; and
acquiring the components of the adapted service content from the wireless broadcast network using the retrieved wireless broadcast network address, wherein:
a content portion and a service guide portion of the second type of service content are transmitted using different protocols;
a portion of data flows associated with the second type of service content but excluding service guide information is transported over an Internet protocol UP) layer for delivery as IP datacast services ("IPDS"); and service guide information associated with the second type of service content is transported as file delivery services over a file delivery layer.

58. A mobile device for receiving mobile broadcast content from a first wireless broadcast network, the device comprising:
a processor; and
a mobile broadcast receiver coupled to the processor,
wherein the processor is configured with processor-executable instructions to receive a service content adapted for transport over the first wireless broadcast network, service bootstrap information of the service content adapted for transport over the first wireless broadcast network, and a service address of the service content mapped to a wireless broadcast network address by performing operations comprising:
discovering a wireless broadcast network address for each service layer data flow from its service layer address;
acquiring service bootstrap information for the service content from the discovered wireless broadcast network address;
deriving a wireless broadcast network address for a service guide session from the service bootstrap information;
acquiring the service guide session from the derived wireless broadcast network address;
retrieving a service layer address for each service layer flow carrying one or more components of the service content from the acquired service guide session;
retrieving a wireless broadcast network address associated with the service layer address for each service layer flow; and
acquiring the components of the adapted service content from the first wireless broadcast network using the retrieved wireless broadcast network address,
wherein:
a content portion and a service guide portion of the second type of service content are transmitted using different protocol;
a portion of data flows associated with the second type of service content but excluding service guide information is transported over an Internet protocol (IP) layer for delivery as IP datacast services ("IPDS"); and
service guide information associated with the second type of service content is transported as file delivery services over a file delivery layer.

59. A mobile device for receiving from a first wireless broadcast network a service content adapted for transport over the first wireless broadcast network, service bootstrap information of the service content adapted for transport over the first wireless broadcast network, and a service address of the service content mapped to a first wireless broadcast network address, the mobile device comprising:
means for discovering a wireless broadcast network address for each service layer data flow from its service layer address;
means for acquiring service bootstrap information for the service content from the discovered wireless broadcast network address;
means for deriving a wireless broadcast network address for a service guide session from the service bootstrap information;
means for acquiring the service guide session from the derived wireless broadcast network address;
means for retrieving a service layer address for each service layer flow carrying one or more components of the service content from the acquired service guide session;
means for retrieving a wireless broadcast network address associated with the service layer address for each service layer flow; and
means for acquiring the components of the adapted service content from the first wireless broadcast network using the retrieved wireless broadcast network address,
wherein:
a content portion and a service guide portion of the second type of service content are transmitted using different protocol;
a portion of data flows associated with the second type of service content but excluding service guide information is transported over an Internet protocol UP) layer for delivery as IP datacast services ("IPDS"); and
service guide information associated with the second type of service content is transported as file delivery services over a file delivery layer.

60. A non-transitory computer-readable medium having stored thereon software instructions configured to cause a processor to perform operations comprising:
receiving within a wireless broadcast service content adapted for transport over a first wireless broadcast network, service bootstrap information of the service content adapted for transport over the first wireless broadcast network, and a service address of the service content mapped to a first wireless broadcast network address;
discovering a wireless broadcast network address for each service layer data flow from its service layer address;
acquiring service bootstrap information for the service content from the discovered wireless broadcast network address;
deriving a wireless broadcast network address for a service guide session from the service bootstrap information;
acquiring the service guide session from the derived wireless broadcast network address;
retrieving a service layer address for each service layer flow carrying one or more components of the service content from the acquired service guide session;
retrieving a wireless broadcast network address associated with the service layer address for each service layer flow; and
acquiring the components of the adapted service content from the first wireless broadcast network using the retrieved wireless broadcast network address,
wherein:
a content portion and a service guide portion of the second type of service content are transmitted using different protocol;
a portion of data flows associated with the second type of service content but excluding service guide information is transported over an Internet protocol (IP) layer for delivery as IP datacast services ("IPDS"); and
service guide information associated with the second type of service content is transported as file delivery services over a file delivery layer.

61. A method of receiving a second type of service content at a receiving device configured to receive a first type of service content over a first wireless broadcast network, the method comprising:
acquiring a service guide bootstrap session for the second type of service content from a first network address associated with the first wireless broadcast network;

deriving a second network address for a service guide session from an IP address and a port number found in the service guide bootstrap session;
acquiring the service guide session from the second network address;
retrieving an IP address and a port number for each IP flow carrying one or more components of the second type of service content;
retrieving a network address associated with the IP address and the port number for each IP flow; and
acquiring the components of the second type of service content from the network address,
wherein:
a content portion and a service guide portion of the second type of service content are transmitted using different protocol;
a portion of data flows associated with the second type of service content but excluding service guide information is transported over an Internet protocol (IP) layer for delivery as IP datacast services ("IPDS"); and
service guide information associated with the second type of service content is transported as file delivery services over a file delivery layer.

62. A device for receiving mobile broadcast content, the device comprising:
a processor; and
a mobile broadcast receiver coupled to the processor,
wherein the processor is configured with processor-executable instructions to perform operations comprising:
acquiring a service guide bootstrap session for a second type of service content, different from a first type of service content associated with a first mobile broadcast content, from a first network address associated with a first wireless broadcast network;
deriving a second network address for a service guide session from an IP address and a port number found in the service guide bootstrap session;
acquiring the service guide session from the second network address;
retrieving an IP address and a port number for each IP flow carrying one or more components of the second type of service content;
retrieving a network address associated with the IP address and the port number for each IP flow; and
acquiring the components of the second type of service content from the network address,
wherein:
a content portion and a service guide portion of the second type of service content are transmitted using different protocol;
a portion of data flows associated with the second type of service content but excluding service guide information is transported over an Internet protocol (IP) layer for delivery as IP datacast services ("IPDS"); and
service guide information associated with the second type of service content is transported as file delivery services over a file delivery layer.

63. A device for accessing mobile broadcast content, the device comprising:
means for acquiring a service guide bootstrap session for a second type of service content, different from a first type of service content associated with a first mobile broadcast content, from a first network address associated with a first wireless broadcast network;
means for deriving a second network address for a service guide session from an IP address and a port number found in the service guide bootstrap session;
means for acquiring the service guide session from the second network address;
means for retrieving an IP address and a port number for each IP flow carrying one or more components of the second type of service content;
means for retrieving a network address associated with the IP address and the port number for each IP flow; and
means for acquiring the components of the second type of service content from the network address,
wherein:
a content portion and a service guide portion of the second type of service content are transmitted using different protocol;
a portion of data flows associated with the second type of service content but excluding service guide information is transported over an Internet protocol (IP) layer for delivery as IP datacast services ("IPDS"); and
service guide information associated with the second type of service content is transported as file delivery services over a file delivery layer.

64. A non-transitory computer-readable medium having stored thereon software instructions configured to cause a processor to perform operations comprising:
acquiring a service guide bootstrap session for a second type of service content, different from a first type of service content associated with a first mobile broadcast content, from a first network address associated with a first wireless broadcast network;
deriving a second network address for a service guide session from an IP address and a port number found in the service guide bootstrap session;
at least one instruction for acquiring the service guide session from the second network address;
retrieving an IP address and a port number for each IP flow carrying one or more components of the second type of service content;
retrieving a network address associated with the IP address and the port number for each IP flow; and
acquiring the components of the second type of service content from the network address,
wherein:
a content portion and a service guide portion of the second type of service content are transmitted using different protocol;
a portion of data flows associated with the second type of service content but excluding service guide information is transported over an Internet protocol (IP) layer for delivery as IP datacast services ("IPDS"); and
service guide information associated with the second type of service content is transported as file delivery services over a file delivery layer.

65. A method for carrying broadcast services over a first wireless broadcast network that carries a first type of service content, the method comprising:
performing a service transport adaptation on a second type of service content different from the first type of service content such that a content portion and a service guide portion of the second type of service content are transmitted using different protocols:
performing a service bootstrapping adaptation on the second type of service content;
performing a service address to network address adaptation for the second type of service content by adding a network address of each service layer data flow to service layer information that describes service layer data flows; and broadcasting the adapted second type of service content over the first wireless broadcast network, wherein adding a network address of each service layer data flow to service layer information that describes service layer data flows comprises:

adding a wireless broadcast network address filed to each electronic service guide (ESG) descriptor to describe the wireless broadcast address for each ESG session when the second type of service content follows DVB-IPDC standards;

adding a wireless broadcast network address filed to each entry in a session partition declaration of an ESG initialization (init) container to describe the wireless broadcast address of each ESG session when the second type of service content follows DVB-IPDC standards and multi-stream ESG transport mode is used;

adding a wireless broadcast network address filed to each media descriptor in each inline or out-of-band SDP file referenced by an acquisition fragment to describe the wireless broadcast address for each media component when the second type of service content follows DVB-IPDC standards;

adding a wireless broadcast network address filed to each instance of a transport element in each service guide delivery descriptor (SGDD) to describe the wireless broadcast address for each service guide (SG) session when the second type of service content follows OMA BCAST standards; and adding a wireless broadcast network address filed to each media description in each inline or out-of-band SDP file referenced by an acquisition fragment to describe the wireless broadcast address of each media component when the second type of service content follows OMA BCAST standards.

66. A server for broadcasting content over a first wireless broadcast network of a first type of service content, the server comprising:

a processor configured with executable instructions to perform operations comprising:

performing a service transport adaptation on a second type of service content different from the first type of service content such that a content portion and a service guide portion of the second type of service content are transmitted using different protocols;

performing a service bootstrapping adaptation on the second type of service content;

performing a service address to network address adaptation for the second type of service content by adding a wireless broadcast network address of each service layer data flow to service layer information that describes service layer data flows; and broadcasting the adapted second type of service content over the first wireless broadcast network, wherein adding a wireless broadcast network address of each service layer data flow to service layer information that describes service layer data flows comprises:

adding a wireless broadcast network address filed to each electronic service guide (ESG) descriptor to describe the wireless broadcast address for each ESG session when the second type of service content follows DVB-IPDC standards;

adding a wireless broadcast network address filed to each entry in a session partition declaration of an ESG initialization (init) container to describe the wireless broadcast address of each ESG session when the second type of service content follows DVB-IPDC standards and multi-stream ESG transport mode is used;

adding a wireless broadcast network address filed to each media descriptor in each inline or out-of-band SDP file referenced by an acquisition fragment to describe the wireless broadcast address for each media component when the second type of service content follows DVB-IPDC standards;

adding a wireless broadcast network address filed to each instance of a transport element in each service guide delivery descriptor (SGDD) to describe the wireless broadcast address for each service guide (SG) session when the second type of service content follows OMA BCAST standards; and adding a wireless broadcast network address filed to each media description in each inline or out-of-band SDP file referenced by an acquisition fragment to describe the wireless broadcast address of each media component when the second type of service content follows OMA BCAST standards.

67. A server for broadcasting content over a first wireless broadcast network of a first type of service content, the server comprising:

means for performing a service transport adaptation on a second type of service content different from the first type of service content such that a content portion and a service guide portion of the second type of service content are transmitted using different protocols;

means for performing a service bootstrapping adaptation on the second type of service content;

means for performing a service address to network address adaptation for the second type of service content, wherein means for performing the service address to network address adaptation comprises means for adding a wireless broadcast network address of each service layer data flow to service layer information that describes service layer data flows; and means for broadcasting the adapted second type of service content over the first wireless broadcast network, wherein means for adding a wireless broadcast network address of each service layer data flow to service layer information that describes service layer data flows comprises:

means for adding a wireless broadcast network address filed to each electronic service guide (ESG) descriptor to describe the wireless broadcast address for each ESG session when the second type of service content follows DVB-IPDC standards;

means for adding a wireless broadcast network address filed to each entry in a session partition declaration of an ESG initialization (init) container to describe the wireless broadcast address of each ESG session when the second type of service content follows DVB-IPDC standards and multi-stream ESG transport mode is used;

means for adding a wireless broadcast network address filed to each media descriptor in each inline or out-of-band SDP file referenced by an acquisition fragment to describe the wireless broadcast address for each media component when the second type of service content follows DVB-IPDC standards;

means for adding a wireless broadcast network address filed to each instance of a transport element in each service guide delivery descriptor (SGDD) to describe the wireless broadcast address for each service guide (SG) session when the second type of service content follows OMA BCAST standards; and means for adding a wireless broadcast network address filed to each media description in each inline or out-of-band SDP file referenced by an acquisition fragment to describe the wireless broadcast address of each media component when the second type of service content follows OMA BCAST standards.

68. A non-transitory computer-readable medium having stored thereon software instructions configured to cause a processor to perform operations comprising:

performing a service transport adaptation on a second type of service content to enable transport of the second type of service content over a first wireless broadcast network of a first type of service content different from the second type of service content such that a content portion and a service guide portion of the second type of service content are transmitted using different protocols;

performing a service bootstrapping adaptation on the second type of service content;

performing a service address to network address adaptation for the second type of service content by adding a wireless broadcast network address of each service layer data flow to service layer information that describes service layer data flows; and broadcasting the adapted second type of service content over the first wireless broadcast network, wherein adding a wireless broadcast network address of each service layer data flow to service layer information that describes service layer data flows comprises:

adding a wireless broadcast network address filed to each electronic service guide (ESG) descriptor to describe the wireless broadcast address for each ESG session when the second type of service content follows DVB-IPDC standards;

adding a wireless broadcast network address filed to each entry in a session partition declaration of an ESG initialization container to describe the wireless broadcast address of each ESG session when the second type of service content follows DVB-IPDC standards and multi-stream ESG transport mode is used;

adding a wireless broadcast network address filed to each media descriptor in each inline or out-of-band SDP file referenced by an acquisition fragment to describe the wireless broadcast address for each media component when the second type of service content follows DVB-IPDC standards;

adding a wireless broadcast network address filed to each instance of a transport element in each service guide delivery descriptor (SGDD) to describe the wireless broadcast address for each service guide (SG) session when the second type of service content follows OMA BCAST standards; and adding a wireless broadcast network address filed to each media description in each inline or out-of-band SDP file referenced by an acquisition fragment to describe the wireless broadcast address of each media component when the second type of service content follows OMA BCAST standards.

\* \* \* \* \*